US012711668B2

(12) United States Patent
Hu

(10) Patent No.: US 12,711,668 B2
(45) Date of Patent: Aug. 18, 2026

(54) DATA PROCESSING METHOD AND RELATED DEVICE OF POINT CLOUD MEDIA

(71) Applicant: Tencent Technology (Shenzhen) Company Limited, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/991,995

(22) Filed: Dec. 23, 2024

(65) Prior Publication Data

US 2025/0124605 A1 Apr. 17, 2025

Related U.S. Application Data

(63) Continuation of application No. PCT/CN2023/106340, filed on Jul. 7, 2023.

(30) Foreign Application Priority Data

Sep. 19, 2022 (CN) ........................ 202211137844.1

(51) Int. Cl.
*G06T 9/00* (2006.01)
*H04N 19/172* (2014.01)
*H04N 19/70* (2014.01)

(52) U.S. Cl.
CPC ........... *G06T 9/001* (2013.01); *H04N 19/172* (2014.11); *H04N 19/70* (2014.11)

(58) Field of Classification Search
CPC ...... G06T 9/001; H04N 19/172; H04N 19/70; H04N 13/106; H04N 19/42; H04N 19/597
See application file for complete search history.

(56) References Cited

U.S. PATENT DOCUMENTS

| | | | | |
|---|---|---|---|---|
| 2010/0316134 A1* | 12/2010 | Chen | ................. | H04N 21/2365 375/E7.2 |
| 2017/0347120 A1* | 11/2017 | Chou | ..................... | H04N 19/89 |
| 2019/0087979 A1* | 3/2019 | Mammou | ............ | H04N 19/597 |

(Continued)

FOREIGN PATENT DOCUMENTS

| | | |
|---|---|---|
| CN | 112583803 A | 3/2021 |
| CN | 114097229 A | 2/2022 |

(Continued)

OTHER PUBLICATIONS

International Search Report of PCT/CN2023/106340 dated Nov. 4, 2023 [PCT/ISA/210].

(Continued)

*Primary Examiner* — Jared Walker
(74) *Attorney, Agent, or Firm* — Sughrue Mion, PLLC

(57) ABSTRACT

A data processing method of point cloud media, performed by a computer device, includes: obtaining a point cloud code stream of the point cloud media including one or more point cloud frames and parameter information of the one or more point cloud frames; and decoding the point cloud code stream based on the parameter information to present the point cloud media, wherein the parameter information indicates at least one of: a frame serial number, frame timestamp information, frame space information, or intra-frame data unit information.

20 Claims, 6 Drawing Sheets

(56) References Cited

U.S. PATENT DOCUMENTS

2020/0381022 A1* 12/2020 Ilola .................... G11B 27/102
2021/0049790 A1* 2/2021 Gao ......................... G06T 9/00
2021/0112281 A1* 4/2021 Wang ..................... H04L 65/70
2021/0329052 A1* 10/2021 Oh ....................... H04L 65/762
2021/0407144 A1* 12/2021 Ramasubramonian ..................... G06T 17/20
2022/0109884 A1* 4/2022 Ramasubramonian ..................... H04N 19/597
2022/0164992 A1* 5/2022 Guede ...................... G06T 9/00
2022/0207780 A1* 6/2022 Ramasubramonian ..................... H04N 19/172
2023/0360277 A1* 11/2023 Hu ........................ H04N 19/42
2023/0377208 A1* 11/2023 Akhtar ..................... G06T 3/40

FOREIGN PATENT DOCUMENTS

CN 115866274 A 3/2023
EP 3893203 A1 10/2021
WO 2019/093834 A1 5/2019
WO 2021/207406 A2 10/2021

OTHER PUBLICATIONS

Written Opinion of PCT/CN2023/106340 dated Nov. 4, 2023 [PCT/ISA/237].
Office Action issued Jan. 21, 2026 in Chinese Application No. 202211137844.1.
Extended European Search Report issued Dec. 16, 2025 in EP Application No. 23867088.9.

* cited by examiner

DATA PROCESSING METHOD AND RELATED DEVICE OF POINT CLOUD MEDIA

CROSS-REFERENCE TO RELATED APPLICATIONS

This application is a continuation application of International Application No. PCT/CN2023/106340 filed on Jul. 7, 2023, which claims priority to Chinese Patent Application No. 202211137844.1 filed with the China National Intellectual Property Administration on Sep. 19, 2022, the disclosures of each being incorporated by reference herein in their entireties.

FIELD

The disclosure relates to the field of communication technologies, and in particular, to a data processing method of point cloud media, a data processing apparatus of point cloud media, a computer device, a computer-readable storage medium, and a computer program product.

BACKGROUND

With the continuous development of the point cloud technology, compression and encoding of point cloud media has become an important research issue. In the existing point cloud compression and encoding technology, parameter information such as a sequence header, point cloud slice information, and the like may be defined, However, problems remain in the current point cloud compression and encoding technology. For example, the parameter information in a point cloud code stream may not be organized, which may lead to problems such as inefficiencies and wasted resources on a decoding side.

SUMMARY

Provided are a data processing method and related device of point cloud media, capable of organizing parameter information in a point cloud code stream, guiding decoding and presentation of the point cloud media, and reducing resource overhead of a decoder side.

A data processing method of point cloud media, performed by a computer device, includes: obtaining a point cloud code stream of the point cloud media including one or more point cloud frames and parameter information of the one or more point cloud frames; and decoding the point cloud code stream based on the parameter information to present the point cloud media, wherein the parameter information indicates at least one of: a frame serial number, frame timestamp information, frame space information, or intra-frame data unit information.

A data processing apparatus of point cloud media, includes: at least one memory configured to store computer program code; and at least one processor configured to read the program code and operate as instructed by the program code, the program code including: obtaining code configured to cause at least one of the at least one processor to obtain a point cloud code stream of the point cloud media including one or more point cloud frames and parameter information of the one or more point cloud frames, and processing code configured to cause at least one of the at least one processor to decode the point cloud code stream based on the parameter information, wherein the parameter information indicates at least one of: a frame serial number, frame timestamp information, frame space information, or intra-frame data unit information.

A non-transitory computer-readable storage medium, storing computer code which, when executed by at least one processor, causes the at least one processor to at least: obtain a point cloud code stream of point cloud media including one or more point cloud frames and parameter information of the one or more point cloud frames, and decode the point cloud code stream based on the parameter information, wherein the parameter information indicates at least one of: a frame serial number, frame timestamp information, frame space information, or intra-frame data unit information.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

The terms "first", "second", and the like are used for distinguishing between same items or items of which effects and functions may be similar. The "first", "second", and "$n^{th}$" do not have a dependency relationship in logic or time sequence, and a number and an execution order thereof are not limited.

The term "at least one" means one or more, and "a plurality of" means two or more. Similarly, the term "at least one group" means one or more groups, and "a plurality of groups" means two or more groups. For example, a point in a point cloud includes a plurality of groups of attribute data, which means that the point includes two or more groups of attribute data.

Other technical terms are described below.

1. Immersive Media

Figure 1A:
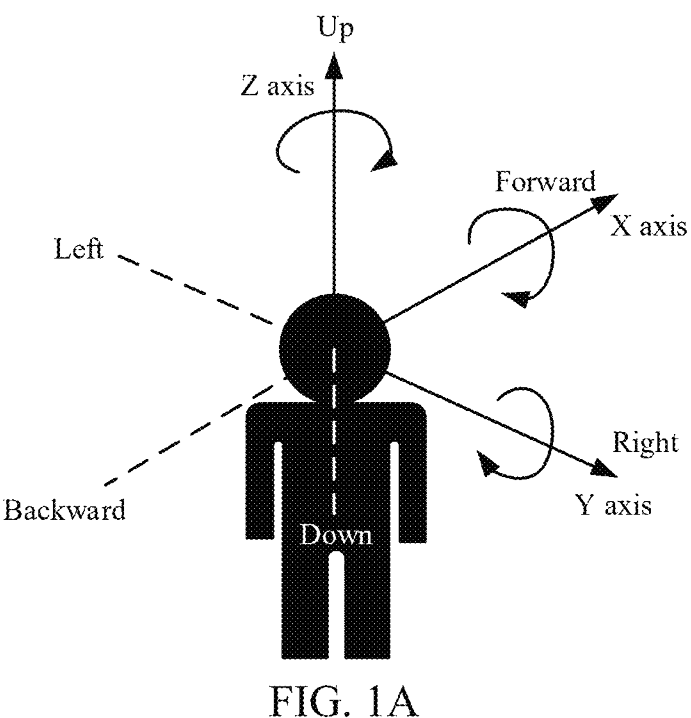
FIG. 1A is a schematic diagram of a 6 DoF according to some embodiments.
Figure 1B:
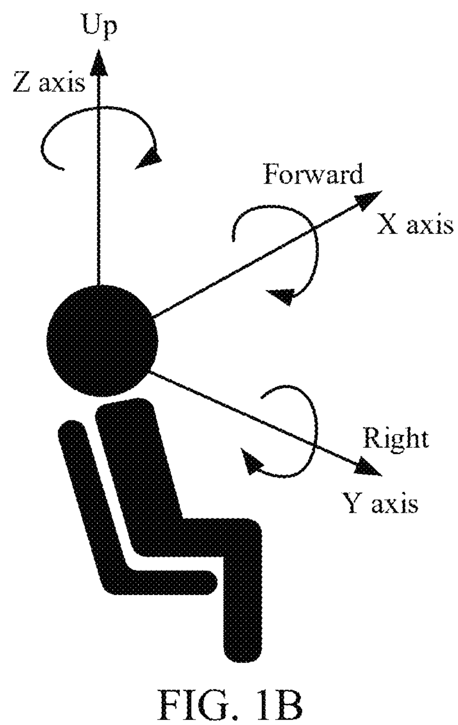
FIG. 1B is a schematic diagram of a 3 DoF according to some embodiments.
Figure 1C:
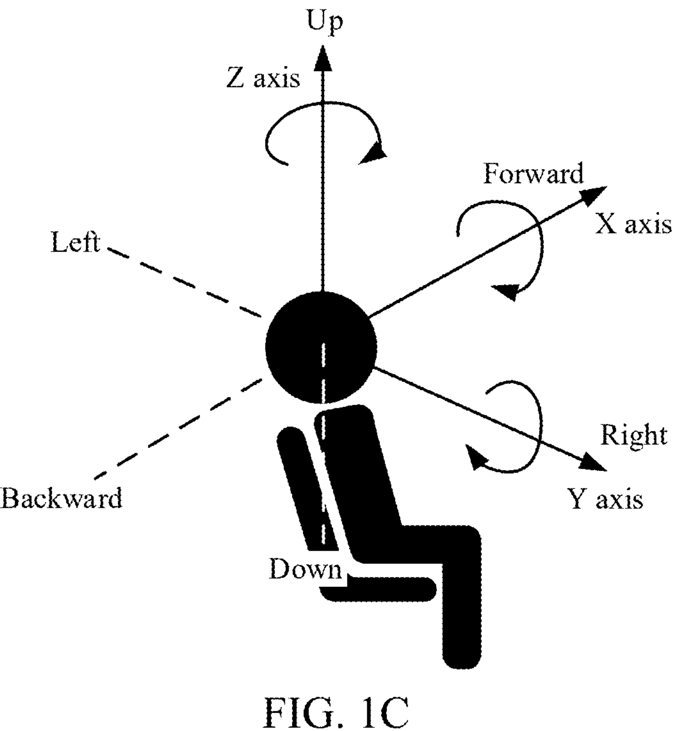
FIG. 1C is a schematic diagram of a 3 DoF+ according to some embodiments.
Figure 6:
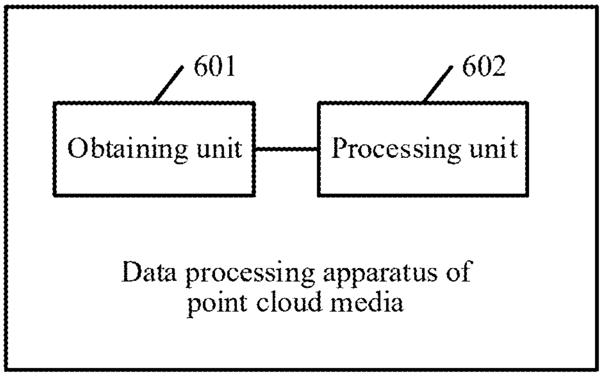
FIG. 6 is a schematic diagram of a structure of a data processing apparatus of point cloud media according to some embodiments.

Immersive media is media files that can provide immersive media content, so that a viewer immersed in the media content can obtain visual, auditory, and other sensory experiences in the real world. The immersive media may be divided into: 6 DoF (Degree of Freedom) immersive media, 3 DoF immersive media, and 3 DoF+ immersive media according to a degree of freedom in consuming media content of the viewer. As shown in FIG. 1A, 6 DoF means that the viewer of the immersive media can freely translate along an X-axis, a Y-axis, and a Z-axis. For example, the viewer of the immersive media can move freely in three-dimensional 360-degree VR content. Similar to the 6 DoF, there are 3 DoF and 3 DoF+ production technologies. FIG. 1B is a schematic diagram of 3 DoF according to some embodiments. As shown in FIG. 1B, the 3 DoF means that the viewer of the immersive media is fixed at a center point of three-dimensional space, and a head of the viewer of the immersive media rotates along the X-axis, the Y-axis, and the Z-axis to watch an image provided by the media content. FIG. 1C is a schematic diagram of 3 DoF+ according to some embodiments. As shown in FIG. 1C, the 3 DoF+ means that when a virtual scene provided by the immersive media has depth information, the head of the viewer of the immersive media can move in limited space based on the 3 DoF to watch an image in the media content.

2. Point Cloud

The point cloud is a set of discrete points that are randomly distributed in space and express a spatial structure and a surface attribute of a three-dimensional object or scene. Each point in the point cloud includes at least geometry data, and the geometry data is configured for representing three-dimensional position information of the point. According to different application scenarios, the point in the point cloud may further include one or more groups of attribute data. Each group of attribute data is configured for reflecting an attribute possessed by the point. The attribute may be, for example, color, material, or other information. Each point in the point cloud may have the same number of groups of attribute data.

The point cloud can flexibly and conveniently express the spatial structure and the surface attribute of the three-dimensional object or scene, so the point cloud is widely used, and used in scenes such as a virtual reality (VR) game, a computer aided design (CAD), a geography information system (GIS), an autonomous navigation system (ANS), a digital cultural heritage, free viewpoint broadcasting, three-dimensional immersive telepresence, and three-dimensional reconstruction of biological tissues and organs.

The main ways to obtain the point cloud are as follows: computer generation, 3-dimension (3D) laser scanning, 3D photogrammetry, and the like. The point cloud can be obtained by collecting a real-world visual scene by using a collection device (a set of cameras or a camera device with a plurality of lenses and sensors). A point cloud of a static real-world three-dimensional object or scene can be obtained through the 3D laser scanning, and millions of point clouds can be obtained per second. A point cloud of a dynamic real-world three-dimensional object or scene can be obtained through the 3D photogrammetry, and ten millions of point clouds can be obtained per second. In addition, in the medical field, a point cloud of a biological tissue and organ can be obtained through magnetic resonance imaging (MRI), computed tomography (CT), and electromagnetic positioning information. In another example, the point cloud can further be directly generated by a computer based on a virtual three-dimensional object and scene. For example, the computer can generate the point cloud of the virtual three-dimensional object and scene. With the continuous accumulation of large-scale point cloud data, efficient storage, transmission, publishing, sharing and standardization of the point cloud data have become the key to point cloud applications.

3. Point Cloud Media

The point cloud media is a typical type of 6 DoF immersive media. The point cloud media include a point cloud sequence including one or more point cloud frames in sequence. Each point cloud frame includes geometry data and attribute data of one or more points in the point cloud. The geometry data may be referred to as three-dimensional position information. Geometry data of a point in the point cloud is spatial coordinates (x, y, z) of the point, for example, including a coordinate value of the point in each coordinate axis direction of a three-dimensional coordinate system, for example, a coordinate value x in an X-axis direction, a coordinate value y in a Y-axis direction, and a coordinate value z in a Z-axis direction. Each point cloud frame can be surrounded by a bounding box. The bounding box may be a smallest cuboid surrounding the point cloud frame. Therefore, space information of each point cloud frame may include at least one of the following: coordinate information of an origin of a bounding box of the point cloud frame, width information of a bounding box of a current point cloud frame, or depth information of a bounding box of a current point cloud frame. The coordinate information of the origin of the bounding box of the point cloud frame may include an x-coordinate of the origin of the bounding box of the point cloud frame, a y-coordinate of the origin of the bounding box of the point cloud frame, and a z coordinate of the origin of the bounding box of the point cloud frame.

A point in the point cloud may include one or more groups of attribute data. Each group of attribute data is configured for reflecting an attribute of the point. For example, a point in the point cloud has a group of color attribute data, and the color attribute data is configured for reflecting a color attribute of the point (such as red and yellow). In another example, a point in the point cloud has a group of reflectance attribute data, and the reflectance attribute data is configured for reflecting a laser reflection intensity attribute of the point. When a point in the point cloud has a plurality of groups of attribute data, types of the plurality of groups of attribute data may be the same or different. For example, a point in the point cloud may have a group of color attribute data and a group of reflectance attribute data. In another example, a point in the point cloud may have two groups of color attribute data, and the two groups of color attribute data are configured for reflecting color attributes of the point at different moments.

4. Data Unit in a Point Cloud Frame

A point cloud frame may include one or more data units. In some embodiments, when the point cloud frame includes one data unit, the data unit is the point cloud frame. In some embodiments, a point cloud frame may be divided into a plurality of point cloud slices, and each point cloud slice is a data unit of the point cloud frame. The point cloud slice represents a set of a series of syntax elements (such as a geometry point cloud slice and an attribute point cloud slice) of data obtained by partially or fully encoding a point cloud frame. For example, the point cloud slice may include geometry data in the point cloud frame, or the point cloud slice may include one or more groups of attribute data of the point cloud frame, or the point cloud slice may include geometry data in the point cloud frame and one or more groups of attribute data. In some embodiments, a type of data included in the point cloud slice may be used as an independent data unit, for example, geometry data of a point cloud slice may be used as a data unit; and a group of attribute data in a point cloud slice may be used as a data unit.

5. Point Cloud Compression (PCC)

The point cloud compression is a process of encoding the geometry data and the attribute data of each point in the point cloud to obtain a point cloud code stream. The point cloud compression may include two main processes: geometry data encoding and attribute data encoding. In an encoding process, geometry-based point cloud compression (G-PCC) may be used to encode the geometry data of each point in the point cloud media to obtain a geometry code stream; the G-PCC is used to encode the attribute data of each point in the point cloud media to obtain an attribute code stream; and the geometry code stream and the attribute code stream jointly form the point cloud code stream of the point cloud media.

The point cloud code stream may include metadata information, and the metadata information may include one or more of the following information: a sequence header parameter set (Sequence Header), a geometry header parameter set (Geometry Header), an attribute header parameter set (Attribute Header), and point cloud slice information. The sequence header parameter set, the geometry header parameter set, the attribute header parameter set, and the point cloud slice information are explained separately.

(1) Sequence Header Parameter Set

The sequence header parameter set includes decoding parameters for decoding the point cloud sequence corresponding to the point cloud code stream. Syntax of the sequence header parameter set is shown in Table 1.

TABLE 1

| | Descriptor |
|---|---|
| sequence_header( ) { | |
| profile_id | u(8) |
| level_id | u(8) |
| sequencing_parameters_set_id | ue(v) |
| marker_bit | f(1) |
| bounding_box_offset_x_upper | se(v) |
| marker_bit | f(1) |
| bounding_box_offset_x_lower | se(v) |
| marker_bit | f(1) |
| bounding_box_offset_y_upper | se(v) |
| marker_bit | f(1) |
| bounding_box_offset_y_lower | se(v) |
| marker_bit | f(1) |
| bounding_box_offset_z_upper | se(v) |
| marker_bit | f(1) |
| bounding_box_offset_z_lower | se(v) |
| marker_bit | f(1) |
| bounding_box_size_width_upper | ue(v) |
| marker_bit | f(1) |
| bounding_box_size_width_lower | ue(v) |
| marker_bit | f(1) |
| bounding_box_size_height_upper | ue(v) |
| marker_bit | f(1) |
| bounding_box_size_height_lower | ue(v) |
| marker_bit | f(1) |
| bounding_box_size_depth_upper | ue(v) |
| marker_bit | f(1) |
| bounding_box_size_depth_lower | ue(v) |
| marker_bit | f(1) |
| quant_step_upper | u(16) |
| marker_bit | f(1) |
| quant_step_lower | u(16) |
| geomRemoveDuplicateFlag | u(1) |
| marker_bit | f(1) |
| attribute_present_flag | |
| if (attribute_present_flag) { | |
| attribute_adapt_pred | u(1) |
| attribute_qp | ue(v) |
| maxNumAttributesMinus1 | u(4) |
| } | |
| byte_alignment( ) | |
| } | |

A meaning of each field involved in Table 1 above is as follows.

Profile label field (profile_id): The profile label field is an 8-bit unsigned integer and configured for representing a profile that a bit stream conforms to.

Level label field (level_id): The level label field is an 8-bit unsigned integer and configured for representing a level that the bit stream conforms to.

Sequence parameter set identifier field (sequence_parameter_set_id): The sequence parameter set identifier field provides a sequence parameter set (SPS) identifier for reference by other syntax elements. The identifier is an integer ranging from 0 to 31.

Bounding box origin x-coordinate upper bit part field (bounding_box_offset_x_upper): This field is an unsigned integer and configured for representing a number of bits higher than 16 bits in the x-coordinate of the bounding box.

Bounding box origin x-coordinate lower bit part field (bounding_box_offset_x_lower): This field is an unsigned integer and configured for representing a number of bits lower than 16 bits in the x-coordinate of the origin of the bounding box. In this case, the x-coordinate of the origin of the bounding box is: Bounding_box_offset_x=(bounding_box_offset_x_upper)<<16+bounding_box_offset_x_lower.

Bounding box origin y-coordinate upper bit part field (bounding_box_offset_y_upper): This field is an unsigned integer and configured for representing a number of bits higher than 16 bits in the y-coordinate of the bounding box.

Bounding box origin y-coordinate lower bit part field (bounding_box_offset_y_lower): This field is an unsigned integer and configured for representing a number of bits lower than 16 bits in the y-coordinate of the origin of the bounding box. In this case, the y-coordinate of the origin of the bounding box is: Bounding_box_offset_y=(bounding_box_offset_y_upper)<<16+bounding_box_offset_y_lower.

Bounding box origin z-coordinate upper bit part field (bounding_box_offset_z_upper): This field is an unsigned integer and configured for representing a number of bits higher than 16 bits in the z-coordinate of the bounding box.

Bounding box origin z-coordinate lower bit part field (bounding_box_offset_z_lower): This field is an unsigned integer and configured for representing a number of bits lower than 16 bits in the z-coordinate of the origin of the bounding box. In this case, the z coordinate of the origin of the bounding box is: Bounding_box_offset_z=(bounding_box_offset_z_upper)<<16+bounding_box_offset_z_lower.

Bounding box width upper bit part field (bounding_box_size_width_upper): This field is an unsigned integer and configured for representing a number of bits higher than 16 bits of the width of the bounding box.

Bounding box width lower bit part field (bounding_box_size_width_lower): This field is an unsigned integer and configured for representing a number of bits lower than 16 bits of the width of the bounding box. The width of the bounding box is: bounding_box_size_width=(bounding_box_size_width_upper)<<16+bounding_box_size_width_lower.

Bounding box height upper bit part field (bounding_box_size_height_upper): This field is an unsigned integer and configured for representing a number of bits higher than 16 bits of the height of the bounding box.

Bounding box height lower bit part field (bounding_box_size_height_lower): This field is an unsigned integer and configured for representing a number of bits lower than 16 bits of the height of the bounding box. The height of the bounding box is: bounding_box_size_height=(bounding_box_size_height_upper)<<16+bounding_box_size_height_lower.

Bounding box depth upper bit part field (bounding_box_size_depth_upper): This field is an unsigned integer and configured for representing a number of bits higher than 16 bits of the depth of the bounding box.

Bounding box depth lower bit part field (bounding_box_size_depth_lower): This field is an unsigned integer and configured for representing a number of bits lower than 16 bits of the depth of the bounding box. The depth of the bounding box is: bounding_box_size_depth=(bounding_box_size_depth_upper)<<16+bounding_box_size_depth_lower.

Quantization step size upper bit part field (quant_step_lower): This field is a 16-bit field and configured for representing upper 16 bits of a 32-bit floating point number of a quantization step size.

Quantization step size lower bit part field (quant_step_upper): This field is a 16-bit field and configured for representing lower 16 bits of a 32-bit floating point number of a quantization step size. The quantization step size is: quant_step=(float)((quant_step_upper<<16)+quant_step_lower).

Geometry remove duplicate point identifier field (geomRemoveDuplicateFlag): This field is a binary variable and configured for representing whether to remove a duplicate point before geometry encoding. When a value of the geometry remove duplicate point identifier field is a first value (such as "1"), it represents that the duplicate point is removed before geometry encoding, for example, points with the same geometry position are removed; and when the value of the geometry remove duplicate point identifier field is a second value (such as "0"), it represents that the duplicate point is not removed before geometry encoding.

Attribute present identifier field (attribute_present_flag) The attribute present identifier field is a binary variable. When a value of the attribute present identifier field is a first value (such as "1"), it represents that this code stream includes an attribute code; and when the value of the attribute present identifier field is a second value (such as "0"), it represents that this code stream does not include the attribute code.

Maximum number of attributes minus one field (maxNumAttributesMinus1): This field is an unsigned integer. When the maximum number of attributes minus one field is added by 1, it represents a maximum number of attribute codes supported by this standard code stream. A value of the maximum number of attributes minus one field is an integer ranges from 0 to 15. When the maximum number of attributes minus one field does not appear in the code stream, maxNumAttributesMinus1 is 0 by default.

Attribute adaptive prediction identifier field (attribute_adapt_pred): The attribute adaptive prediction identifier field is a binary variable. When a value of the attribute adaptive prediction identifier field is a first value (such as "0"), it represents that there is no adaptively selected value prediction method; and when the value of the attribute adaptive prediction identifier field is a second value (such as '1'), it represents that it is allowed to switch from a geometry position-based value prediction method to an attribute value-based value prediction method.

Attribute quantification parameter field (attribute_qp): The attribute quantization parameter field is an unsigned integer and configured for representing an attribute quantization parameter.

(2) Geometry Header Parameter Set

The geometry header parameter set includes a decoding parameter for decoding geometry data of each point cloud frame in the point cloud code stream. Syntax of the geometry header parameter set may be shown in Table 2.

TABLE 2

| | Descriptor |
|---|---|
| geometry_header( ) { | |
| geometry_parameter_set_id | ue(v) |
| geometry_sequence_parameter_set_id | ue(v) |
| gps_lcu_node_size_log2_minus_one | ue(v) |
| gps_implicit_geom_partition_flag | u(1) |
| if( gps_implicit_geom_partition_flag ) { | |
| gps_max_num_implicit_qtbt_before_ot | ue(v) |
| gps_min_size_implicit_qtbt | ue(v) |
| } | |
| gps_single_mode_flag | u(1) |
| gps_save_state_flag | u(1) |
| byte_alignment( ) | |
| } | |

A meaning of the syntax in Table 2 above is as follows.

Geometry parameter set field (geometry_parameter_set_id): The geometry parameter set field provides a geometry parameter identifier for reference by other syntax elements. The geometry parameter identifier is an integer ranging from 0 to 31.

Geometry sequence parameter set field (geometry_sequence_parameter_set_id): This field is for determining an SPS identifier to be used for a current geometry parameter set. The SPS identifier is an integer ranging from 0 to 31, and the value is consistent for all geometry parameter sets under the same point cloud.

Geometry macroblock node size field (gps_lcu_node_size_log2_minus_one): This field is an unsigned integer and configured for representing whether block structure encoding is enabled. When a value of the node size field of the geometry macroblock is a target preset value (such as "0"), it represents that the block structure encoding is disabled; and when the value of the node size field of the geometry macroblock is greater than the target preset value (for example, the value of the geometry macroblock node size field is greater than "0"), it represents that the block structure encoding is enabled and the geometry node size of the macroblock is defined, for example, gps_lcu_node_size_log2=gps_lcu_node_size_log2_minus_one+1.

Geometry implicit partition identifier field (gps_implicit_geom_partition_flag): This field is a binary variable and configured for indicating whether to disable geometry implicit partition. If a value of the geometry implicit partition identifier field is a first set value (such as "0"), it represents that the geometry implicit partition is disabled; and if the value of the geometry implicit partition identifier field is a second set value (such as "1"), it represents that the geometry implicit partition is enabled.

Maximum number of quadtree/binary tree partition before octree partition field (gps_max_num_implicit_qtbt_before_ot): This field is an unsigned integer. This field is configured for representing a maximum allowed number of quadtree or binary tree partition before octree partition in geometry implicit partition.

Minimum size for quadtree/binary tree partition field (gps_min_size_implicit_qtbt) This field is an unsigned integer. This field is configured for representing a minimum allowed partition size of quadtree or binary tree partition in geometry implicit partition.

Geometry single point encoding mode identifier field (gps_single_mode_flag): This field is a binary variable. When a value of the geometry single point encoding mode identifier field is a first set value (such as "0"), it represents that a geometry single point encoding mode is disabled; and when the value of the geometry single point encoding mode identifier field is a second set value (such as "1"), it represents that the geometry single point encoding mode is enabled.

When the value of the foregoing geometry implicit partition identifier field is the second set value ("1"), gps_max_num_implicit_qtbt_before_ot and gps_min_size_implicit_qtbt may be limited according to a logarithmic size of a root node. The process is shown in Table 3.

TABLE 3

```
if(gps_max_num_implicit_qtbt_before_ot>
 (gsh_log2_max_nodesize-
gsh_log2_min_nodesize))
      gps_max_num_implicit_qtbt_before_ot =
      gsh_log2_max_nodesize -
```

TABLE 3-continued

```
gsh_log2_min_nodesize;
  if (gps_min_size_implicit_qtbt >
  gsh_log2_min_nodesize)
    gps_min_size_implicit_qtbt =
    gsh_log2_min_nodesize
  if (gsh_log2_max_nodesize ==
  gsh_log2_min_nodesize)
      gps_min_size_implicit_qtbt = 0
```

Geometry encoding status save identifier field (gps_save_stat_flag): This field is a binary variable and configured for indicating whether to save an encoding status. When a value of the geometry encoding status save identifier field is a first set value (such as "0"), it represents that the encoding status is not saved, for example, entropy encoding context and hash table information of the geometry encoding are not saved; and when the value of the geometry encoding status save identifier field is a second set value (such as "1"), it represents that the encoding status is saved.

(3) Attribute Header Parameter Set

The attribute header parameter set includes a decoding parameter for decoding attribute data of each point cloud frame in the point cloud code stream. Syntax of the attribute header parameter set is shown in Table 4.

TABLE 4

| | Descriptor |
|---|---|
| attribute_header( ) { | |
| for(attrIdx=0;attrIdx<(maxNumAttributesMinus1 +1);attrIdx ++){ | |
| attributePresentFlag[attrIdx] | u(1) |
| if(attributePresentFlag[attrIdx]){ | |
| outputBitDepthMinus1[attrIdx] | ue(v) |
| if (atttrIdx == 0 \|\| attrIdx == 1) { | |
| maxNumOfNeighboursLog2Minus7[attrIdx] | u(2) |
| numOflevelOfDetail[attrIdx] | ue(v) |
| maxNumOfPredictNeighbours[attrIdx] | ue(v) |
| intraLodFlag[attrIdx] | u(1) |
| log2_golomb_group_size | ue(v) |
| crossAttrTypePred | u(1) |
| if (crossAttrTypePred){ | |
| attrEncodeOrder | u(1) |
| crossAttrTypePredParam1 | u(15) |
| crossAttrTypePredParam2 | u(21) |
| } | |
| } | |
| if (attrIdx == 0) { | |
| cross_component_Pred | u(1) |
| orderSwitch | u(1) |
| half_zero_runlength_enable | u(1) |
| chromaQpOffsetCb | se(v) |
| chromaQpOffsetCr | se(v) |
| colorReorderMode | ue(v) |
| colorGolombNum | ue(v) |
| } | |
| if (attrIdx == 1) { | |
| nearestPredParam1 | ue(v) |
| nearestPredParam2 | ue(v) |
| axisBias | ue(v) |
| refRecorderMode | ue(v) |
| refGolombNum | ue(v) |
| } | |
| } | |
| } | |
| transform | ue(v1) |
| if (transform && | |
| (attributePresentFlag[0] \|\|attributePresentFlag[1])) { | |
| Log2maxNumofCoeffMinus8 | ue(v) |
| coeffLengthControl | ue(v) |

TABLE 4-continued

| | Descriptor |
|---|---|
| attrTransformQpDelta | ue(v) |
| initPredTransRatio | se(v) |
| transResLayer | u(1) |
| attrTransformNumPoints | ue(v) |
| maxTransNum | ue(v) |
| QpOffsetDC | se(v) |
| QpOffsetAC | se(v) |
| if ( attributePresentFlag[0]) { | |
| chromaQpOffsetDC | se(v) |
| chromaQpOffsetAC | se(v) |
| } | |
| if ( attributePresentFlag[1]) { | |
| RefGroupPred | u(1) |
| } | |
| } | |
| byte_alignment( ) | |
| } | |

A meaning of each field involved in Table 4 above is as follows.

Attribute present identifier field (attributePresentFlag[attrIdx]): The attribute present identifier field is a binary variable. When a value of the attribute present identifier field is a first set value (such as 1), an attribute present identifier is configured for representing that this point cloud code stream includes an attrIdx attribute code; and when the value of the attribute present identifier field is a second set value (such as 0), the attribute present identifier field is configured for representing that this point cloud code stream does not include the attrIdx attribute code. attrIdx is an integer ranging from 0 to 15. A meaning of the attribute present identifier field may be explained with reference to Table 5 below.

TABLE 5 x attribute encoding mapping table

| Attribute index (attr_idx) | Attribute description |
|---|---|
| 0 | Color |
| 1 | Reflectance |
| 2 . . . 15 | Reserved |

Attribute transform algorithm identifier field (transform): The attribute transform algorithm identifier field is a binary variable. The attribute transform algorithm identifier field is configured for controlling whether to use wavelet transform to encode attribute data; when a value of the attribute transform algorithm identifier field is a first set value (such as 1), the attribute transform algorithm identifier field is configured for controlling to encode the attribute data by using wavelet transform; and when the value of the attribute transform algorithm identifier field is a second set value (such as 0), the attribute transform algorithm identifier field is configured for controlling to encode the attribute data by using the prediction method.

Attribute transform coefficient quantization parameter difference (attrTransformQpDelta): The attribute transform coefficient quantization parameter difference is an unsigned integer and configured for representing a difference from an attribute residual quantization parameter. Attribute transform coefficient quantization parameter attrTransformQp=attrQuantParam (attribute quantization parameter)+attrTransformQpDelta.

Number of attribute transform points (attrTransformNumPoints): The number of attribute transform points is an unsigned integer and configured for representing the number of points of attribute transform, for example, the wavelet transform using attrTransformNumPoints points; and when a value of the attrTransformNumPoints is a target set value (such as 0), it represents that all points in the slice are used to perform wavelet transform.

Logarithmic value of a maximum number of neighbor points searched minus seven (maxNumOfNeighbour_log2_minus7): The logarithmic value of the maximum number of neighbor points minus seven is an unsigned integer and configured for deriving a variable maxNumOfNeighbour (maximum number of neighbor points), which represents the maximum number of encoded neighbors that can be used for search to control a search range of neighbor candidate points and a number of points cached by hardware during attribute prediction. maxNumOfNeighbour is obtained through the following formula:

max*NumOfNeighbour* = 2(maxNumOfNeighbor_log2_minus7 + 7)

maxNumOfNeighbour_log2_minus7.

Attribute residual secondary prediction field (cross_component_pred): The attribute residual secondary prediction field is a binary variable and configured for indicating whether an attribute residual secondary prediction is allowed; when a value of the attribute residual secondary prediction field is a first set value (such as 1), it represents that the attribute residual secondary prediction is allowed; and when the value of the attribute residual secondary prediction field is a second set value (such as 0), it represents that the attribute residual secondary prediction is not allowed.

Residual encoding order switch field (orderSwitch): The residual encoding order switch field is a binary variable; when a value of the residual encoding order switch field is a first set value (such as 1), it represents that a residual encoding order is a UYV/GRB order; and when the value of the residual encoding order switch field is a second set value (such as 0), it represents that the residual encoding order is an RGB/YUV order.

Half zero runlength enable identifier field (half_zero_runlength_enable): The half zero runlength enable identifier field is a binary variable; when a value of the half zero runlength enable identifier field is a first set value (such as 1), it represents that half zero runlength is used; and when the value of the half zero runlength enable identifier field is a second set value (such as 0), it represents that the half zero runlength is not used.

Chroma channel Cb quantization parameter offset (chromaQpOffsetCb): The chroma channel Cb quantization parameter offset is a signed integer and configured for controlling a Cb channel quantization parameter. A value of the chroma channel Cb quantization parameter offset ranges from −16 to 16. If chromaQpOffsetCb does not exist in current attribute header information, the value of chromaQpOffsetCb is 0, for example, choramQpCb=Clip3(minQP,maxQP,attribute_qp+chromaQpOffsetCb). A quantization parameter of a luminance channel is lumaQp=attribute_qp. A minimum supported quantization parameter is minQP=0, and a maximum supported quantization parameter is maxQP=63.

Chroma channel Cr quantization parameter offset (chromaQpOffsetCr): The chroma channel Cr quantization parameter offset is a signed integer and configured for controlling a Cr channel quantization parameter; and a value of the chroma channel Cr quantization parameter offset ranges from −16 to 16. If chromaQpOffsetCr does not exist in the current attribute header information, the value of chromaQpOffsetCr is 0, for example, choramQpCr=Clip3 (minQP, maxQP, attribute_qp+chromaQpOffsetCr). A quantization parameter of a luminance channel is lumaQp=attribute_qp. A minimum supported quantization parameter is minQP=0, and a maximum supported quantization parameter is maxQP=63.

Nearest neighbor point prediction parameter 1 (nearestPredParam1): The nearest neighbor point prediction parameter 1 is an unsigned integer and configured for controlling a threshold of nearest neighbor point prediction.

Nearest neighbor point prediction parameter 2 (nearestPredParam2): The nearest neighbor point prediction parameter 2 is an unsigned integer and configured for controlling the threshold of nearest neighbor point prediction. The threshold is represented as attrQuantParam*nearestPredParam1+nearestPredParam1.

Spatial bias coefficient (axisBias): The spatial bias coefficient is an unsigned integer and configured for controlling an offset in a Z direction in calculation of an attribute prediction value.

Attribute output bit depth minus one (outputBitDepthMinus1): The attribute output bit depth minus one is an unsigned integer and configured for controlling an attribute output bit depth. The attribute output bit depth minus one ranges from 0 to 15. Attribute output bit depth (outputBitDepth)=outputBitDepthMinus1+1. If this syntax element is not in the point cloud code stream, a default value is zero.

Number of LoD (numOflevelOfDetail): The number of LoD is an unsigned integer and configured for controlling a number of LOD divided during attribute prediction. The numOflevelOfDetail in the code stream that conforms to this section is not to be greater than 32.

Maximum number of neighbor points selected for prediction (maxNumOfPredictNeighbours): The maximum number of neighbor points selected for prediction is an unsigned integer and configured for limiting a number of neighbor points selected during attribute prediction. The maxNumOfPredictNeighbours in the code stream that conforms to this section is not to be greater than 16.

Intra-LoD prediction identifier field (intraLodFlag): The intra-LoD prediction identifier field is a binary variable and configured for controlling whether to enable intra-layer prediction. When a value of the intra-LoD prediction identifier field is a first preset value (such as 1), it represents that the intra-layer prediction is enabled; and when the value of the intra-LoD prediction identifier field is a second preset value (such as 0), it represents that the intra-layer prediction is disabled.

Color reorder mode field (colorReorderMode): The color reorder mode field is an unsigned integer and configured for representing a reorder mode selected for current color information. When a value of the color reorder mode field is a first preset value (such as 0), it represents an original point cloud input order; when the value of the color reorder mode field is a second preset value (such as "1"), it represents Hilbert reorder; and when the value of the color reorder mode field is a third preset value (such as "2"), it represents Morton reorder.

Reflectance reorder mode field (colorReorderMode): The reflectance reorder mode field is an unsigned integer. When a value of the reflectance reorder mode field is a first preset value (such as 0), it represents an original point cloud input order; when the value of the reflectance reorder mode field is a second preset value (such as 1), it represents Hilbert reorder; and when the value of the reflectance reorder mode field is a third preset value (such as 2), it represents Morton reorder.

Maximum cache limit parameter (maxNumofCoeff): The maximum cache limit parameter is an unsigned integer and configured for calculating a number of transform parameters that are limited to the maximum cache in the attribute transform encoding.

Maximum delay limit parameter (coeffLengthControl) The maximum delay limit parameter is an unsigned integer and configured for limiting a maximum number of delays of parameter transform in attribute transform encoding. A maximum number of delay points is calculated as maxNumofCoeff*coeffLengthControl.

Attribute encoding order field (attrEncodeOrder): The attribute encoding order field is a binary variable and configured for controlling an encoding order of attributes when the point cloud includes a plurality of attribute types. When a value of the attribute encoding order field is a first set value (such as 0), it represents that a color is encoded first, and a reflectance is encoded; and when the value of the attribute encoding order field is a second set value (such as 1), it represents that the reflectance is encoded first, and the color is encoded.

Cross-type attribute prediction field (crossAttrTypePred): The cross-type attribute prediction field is a binary variable. When a value of the cross-type attribute prediction field is a first set value (such as 1), it represents that cross-type attribute prediction is allowed; and when the value of the cross-type attribute prediction field is a second set value (such as 0), it represents that the cross-type attribute prediction is not allowed.

Cross-type attribute prediction weight parameter 1 (crossAttrTypePredParam1): The cross-type attribute prediction weight parameter 1 is a 15-bit unsigned integer and configured for controlling a weight parameter 1 for calculating a geometry information distance and an attribute information distance in cross-type attribute prediction.

Cross-type attribute prediction weight parameter 2 (crossAttrTypePredParam2): The cross-type attribute prediction weight parameter 2 is a 21-bit unsigned integer and configured for controlling a weight parameter 2 for calculating a geometry information distance and an attribute information distance in cross-type attribute prediction.

Reflectance group prediction identifier field (refGroupPred): The reflectance group prediction identifier field is a binary variable and configured for controlling whether to enable a reflectance group prediction mode of prediction transform; when a value of the reflectance group prediction identifier field is a first set value (such as 1), it represents that group prediction is enabled; and when the value of the reflectance group prediction identifier field is a second set value (such as 0), it represents that the group prediction is disabled.

Initial prediction transform ratio (initPredTransRatio): The initial prediction transform ratio is a signed integer and configured for controlling, in a multi-layer transform algorithm for attribute compression (transform=1), a size of an initial distance threshold used when a prediction transform tree is built.

Transform residual layer identifier field (transResLayer): The transform residual layer identifier field is a binary variable and configured for controlling, in the multi-layer transform algorithm of attribute compression (transform=1), whether to use attribute residual compensation. When a value of the transResLayer is a first set value (such as 1), it represents that the attribute residual compensation is used; and when the value of the transResLayer is a second set value (such as 0), it represents that the attribute residual compensation is not used.

Color index Golomb order (ColorGolombNum): The color index Golomb order is an unsigned integer and configured for representing an order K of K-order exponential-Golomb used when decoding a current color prediction residual or transform coefficient, where K=ColorGolombNum.

Reflectance index Golomb order (RefGolombNum): The reflectance index Golomb order is an unsigned integer and configured for representing an order K of K-order exponential-Golomb used when decoding a current reflectance prediction residual or transform coefficient, where K=ColorGolombNum.

Current to-be-decoded coefficient decoding mode identifier field (coeffEncodeModeFlag): The current to-be-decoded coefficient decoding mode identifier field is a binary variable; when a value of the current to-be-decoded coefficient decoding mode identifier field is a first set value (such as 1), it represents that a point cloud attribute transform coefficient is decoded according to 9.3.16.3; and when the value of the current to-be-decoded coefficient decoding mode identifier field is a second set value (such as 0), it represents that the point cloud attribute transform coefficient is decoded according to 9.3.12.

(4) Point Cloud Slice Information

The point cloud slice may include the geometry data in the point cloud frame. In this case, the point cloud slice may be referred to as a geometry point cloud slice; the point cloud slice may include one or more groups of attribute data in the point cloud frame. In this case, the point cloud slice may be referred to as an attribute point cloud slice; or the point cloud slice may include both the geometry data of the point cloud frame and one or more groups of attribute data in the point cloud frame.

(1) When the point cloud slice information includes a geometry point cloud slice, syntax of the geometry point cloud slice is shown in Table 6.

TABLE 6

| | • Descriptor |
|---|---|
| • geometry_slice_header( ) { | |
| • slice_id | • ue(v) |
| • gsh_context_mode | • u(1) |
| • if(gps_single_mode_flag) | • |
| • gsh_single_mode | • u(1) |
| • gsh_planar_mode | • u(1) |
| • gsh_bounding_box_offset_x_upper | • u(16) |
| • marker_bit | • f(1) |
| • gsh_bounding_box_offset_x_lower | • u(16) |
| • marker_bit | • f(1) |
| • gsh_bounding_box_offset_y_upper | • u(16) |
| • marker_bit | • f(1) |
| • gsh_bounding_box_offset_y_lower | • u(16) |
| • marker_bit | • f(1) |
| • gsh_bounding_box_offset_z_upper | • u(16) |
| • marker_bit | • f(1) |
| • gsh_bounding_box_offset_z_lower | • u(16) |
| • marker_bit | • f(1) |
| • gsh_bounding_box_nodeSizeXLog2_upper | • ue(v) |
| • marker_bit | • f(1) |
| • gsh_bounding_box_nodeSizeXLog2_lower | • ue(v) |
| • marker_bit | • f(1) |
| • gsh_bounding_box_nodeSizeYLog2_upper | • ue(v) |
| • marker_bit | • f(1) |
| • gsh_bounding_box_nodeSizeYLog2_lower | • ue(v) |
| • marker_bit | • f(1) |
| • gsh_bounding_box_nodeSizeZLog2_upper | • ue(v) |
| • marker_bit | • f(1) |
| • gsh_bounding_box_nodeSizeZLog2_lower | • ue(v) |
| • marker_bit | • f(1) |
| • num_points_upper | • ue(v) |
| • marker_bit | • f(1) |
| • num_points_lower | • ue(v) |
| • marker_bit | • f(1) |
| • byte_alignment( ) | • |
| • } | • |

A meaning of each field in Table 6 above is as follows.

Slice label field (slice_id): The slice label field is an unsigned integer and configured for representing a label of the point cloud slice.

Slice geometry context mode identifier field (gsh_context_mode): This field is a binary variable. The point cloud slice selects different context modes in geometry octree encoding based on a value of the slice geometry context mode identifier field.

Slice geometry single point encoding mode identifier field (gsh_single_mode_flag): This field is a binary variable, and the field is configured for indicating whether to disable a current point cloud slice geometry single point encoding mode; when a value of the slice geometry single point encoding mode identifier field is a first value (such as "0"), it represents that the current point cloud slice geometry single point encoding mode is disabled; and when the value of the slice geometry single point encoding mode identifier field is a second value (such as "1"), it represents that the current point cloud slice geometry single point encoding mode is enabled. When the symbol does not exist in the point cloud code stream, a default value is 0.

Slice geometry planer mode identifier field (gsh_planar_mode): This field is a binary variable, and the field is configured for indicating whether to disable a planer encoding mode of a current point cloud slice; when a value of the slice geometry planer mode identifier field is a first value (such as "0"), it represents that the planer encoding mode of the current point cloud slice is disabled; and when the value of the slice geometry planer mode identifier field is a second value (such as "1"), it represents that the planer encoding mode of the current point cloud slice is enabled.

Slice bounding box origin x-coordinate upper 16-bit part field (gsh_bounding_box_offset_x_upper): This field is a 16-bit field, and the field represents upper 16 bits of a 32-bit signed integer of the x-coordinate of the slice bounding box.

Slice bounding box origin x-coordinate lower 16-bit part field (gsh_bounding_box_offset_x_lower): This field is a 16-bit field, and the field represents lower 16 bits of a 32-bit signed integer of the x-coordinate of the origin of the slice bounding box. The x-coordinate of the origin of the slice bounding box is:

$$gsh\_bounding\_box\_offset\_x = (gsh\_bounding\_box\_offset\_x\_upper) << 16 + gsh\_bounding\_box\_offset\_x\_lower.$$

Slice bounding box origin y-coordinate upper 16-bit part field (gsh_bounding_box_offset_y_upper): This field is a 16-bit field, and the field represents upper 16 bits of a 32-bit signed integer of the y-coordinate of the slice bounding box.

Slice bounding box origin y-coordinate lower 16-bit part field (gsh_bounding_box_offset_y_lower): This field is a 16-bit field, and the field represents lower 16 bits of a 32-bit signed integer of the y-coordinate of the origin of the slice bounding box. The y-coordinate of the origin of the slice bounding box is:

gsh_bounding_box_offset_y = (gsh_bounding_box_offset_y_upper)<< 16 + gsh_bounding_box_offset_y_lower.

Slice bounding box origin z-coordinate upper 16-bit part field (gsh_bounding_box_offset_z_upper): This field is a 16-bit field, and the field represents upper 16 bits of a 32-bit signed integer of the z-coordinate of the slice bounding box.

Slice bounding box origin z-coordinate lower 16-bit part field (gsh_bounding_box_offset_z_lower): This field is a 16-bit field, and the field represents lower 16 bits of a 32-bit signed integer of the z-coordinate of the origin of the slice bounding box. The z-coordinate of the origin of the slice bounding box is:

gsh_bounding_box_offset_z = (gsh_bounding_box_offset_z_upper)<< 16 + gsh_bounding_box_offset_z_lower.

Slice bounding box X direction logarithmic size upper bit part field (gsh_bounding_box_nodeSizeXLog2_upper): This field is an unsigned integer, and the field represents a number of bits higher than 16 bits in the logarithmic size in the X direction of the slice bounding box.

Slice bounding box X direction logarithmic size lower bit part field (gsh_bounding_box_nodeSizeXLog2_lower): This field is an unsigned integer, and the field represents a number of bits lower than 16 bits in the logarithmic size in the X direction of the slice bounding box. The logarithmic size in the X direction of the slice bounding box is:

gsh_bounding_box_nodeSizeXLog2 = (gsh_bounding_box_nodeSizeXLog2_upper)<< 16 + gsh_bounding_box_nodeSizeXLog2_lower.

Slice bounding box Y direction logarithmic size upper bit part field (gsh_bounding_box_nodeSizeYLog2_upper): This field is an unsigned integer, and the field represents a number of bits higher than 16 bits in the logarithmic size in the Y direction of the slice bounding box.

Slice bounding box Y direction logarithmic size lower bit part field (gsh_bounding_box_nodeSizeYLog2_lower): This field is an unsigned integer, and the field represents a number of bits lower than 16 bits in the logarithmic size in the Y direction of the slice bounding box. The logarithmic size in the Y direction of the slice bounding box is:

gsh_bounding_box_nodeSizeYLog2 = (gsh_bounding_box_nodeSizeYLog2_upper)<< 16 + gsh_bounding_box_nodeSizeYLog2_lower.

Slice bounding box Z direction logarithmic size upper bit part field (gsh_bounding_box_nodeSizeZLog2_upper): This field is an unsigned integer, and the field represents a number of bits higher than 16 bits in the logarithmic size in the Z direction of the slice bounding box.

Slice bounding box Z direction logarithmic size lower bit part field (gsh_bounding_box_nodeSizeZLog2_lower): This field is an unsigned integer, and the field represents a number of bits lower than 16 bits in the logarithmic size in the Z direction of the slice bounding box. The logarithmic size in the Z direction of the slice bounding box is:

gsh_bounding_box_nodeSizeZLog2 = (gsh_bounding_box_nodeSizeZLog2_upper)<< 16 + gsh_bounding_box_nodeSizeZLog2_lower.

Number of points in a slice upper bit part field (num_points_upper): This field is an unsigned integer, and the field represents a number of bits higher than 16 bits of the number of points in the slice.

Number of points in a slice lower bit part field (num_points_upper): This field is an unsigned integer, and the field represents a number of bits lower than 16 bits of the number of points in the slice. The number of points in the slice is: num_points=((num_points_upper<<16)+num_points_lower).

In some embodiments, universal geometry data stream syntax of the geometry data stream may further be defined, and the universal geometry data stream syntax may be as shown in Table 7.

TABLE 7

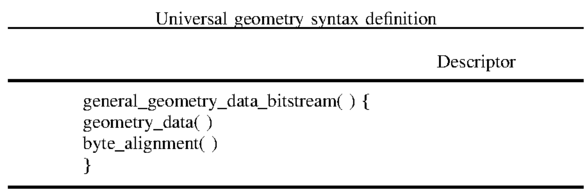

| Universal geometry syntax definition | |
|---|---|
| | Descriptor |
| general_geometry_data_bitstream( ) { | |
| geometry_data( ) | |
| byte_alignment( ) | |
| } | |

(2) When the point cloud slice information includes an attribute point cloud slice, syntax of the attribute point cloud slice is shown in Table 8.

TABLE 8

| | Descriptor |
|---|---|
| attribute_slice_header( ) { | |
| slice_id | ue(v) |
| reflQPoffset | se(v) |
| byte_alignment( ) | |
| } | |

A meaning of each field in Table 8 above is as follows.

Slice label field (slice_id): The slice label field is a label of the point cloud slice.

Reflectance attribute quantization parameter offset field (reflQPoffset): The field is a signed integer and configured for controlling a reflectance attribute quantization parameter, and a value of the field ranges from −32 to 32.

In some embodiments, universal attribute data stream syntax of the attribute data stream may further be defined, and the universal attribute data stream syntax may be as shown in Table 9.

TABLE 9

| Attribute data stream definition | Descriptor |
|---|---|
| general_attribute_data_bitstream( ) { | |
| If (attributePresentFlag[1]) { | • |
| attribute_data_reflectance( ) | • |
| byte_alignment( ) | • |
| } | • |
| if (attributePresentFlag[0]) { | • |
| attribute_data_color( ) | • |
| byte_alignment( ) | • |
| } | • |
| } | • |

6. Point Cloud Decoding

The point cloud decoding is a process of decoding the point cloud code stream obtained through point cloud encoding to reconstruct the point cloud. In detail, it is a process of reconstructing geometry data and attribute data of each point in the point cloud based on a geometry code stream and an attribute code stream in the point cloud code stream. Based on the point cloud code stream being obtained on a decoding side, entropy decoding is first performed on the geometry code stream to obtain quantized geometry data of each point in the point cloud, and dequantization is performed to reconstruct the geometry data of each point in the point cloud. Entropy decoding is first performed on the attribute code stream to obtain quantized prediction residual information or a quantized transform coefficient of each point in the point cloud; and dequantization is performed on the quantized prediction residual information to obtain reconstructed residual information, dequantization is performed on the quantized transform coefficient to obtain a reconstructed transform coefficient, inverse transform is performed on the reconstructed transform coefficient to obtain reconstructed residual information, and attribute data of each point in the point cloud may be reconstructed based on the reconstructed residual information of each point in the point cloud. The reconstructed attribute data of each point in the point cloud sequentially corresponds to the reconstructed geometry data to reconstruct the point cloud.

Based on the foregoing related descriptions, some embodiments provide a data processing solution for point cloud media. The point cloud media may be encoded on an encoding side, to obtain a point cloud code stream, and for each point cloud frame in the point cloud code stream: (1) frame-level parameter information is defined, where the parameter information may include but is not limited to: a frame serial number, frame timestamp information, frame space information, or intra-frame data unit information; (2), whether each point cloud frame includes a geometry header parameter set or an attribute header parameter set is flexibly indicated in the parameter information of each point cloud frame; and (3) based on an encoding process of each point cloud frame, corresponding start code and end code may be added to a data unit in each point cloud frame to implement fast positioning of the data unit on a decoding side. The start code may be configured for indicating a position at which the data unit starts to be encoded, and the end code may be configured for indicating a position at which the data unit ends to be encoded. When the point cloud code stream is decoded on the decoding side, the data unit that may be decoded of each point cloud frame may be quickly positioned based on the parameter information of each point cloud frame included in the point cloud code stream, to implement partial decoding. In addition, depending on whether the geometry header parameter set or the attribute header parameter set is included in the point cloud frame indicated by the parameter information, a corresponding geometry header parameter set or attribute header parameter set may be obtained for correct decoding. In addition, based on the frame serial number and the frame timestamp in the parameter information, decoding and presentation can also be facilitated in an appropriate order at an appropriate time, and resource overheads on the decoding side may be reduced.

The data processing solution for the point cloud media provided in some embodiments may further be combined with the vehicle-to-everything technology. In the data processing solution for the point cloud media, collection time of each point cloud frame may be obtained, and a high-precision map may be updated in real time based on the collection time in an autonomous driving process; and the high-precision map may be configured for positioning, or automatic navigation may be implemented by using the high-precision map.

Figure 2A:
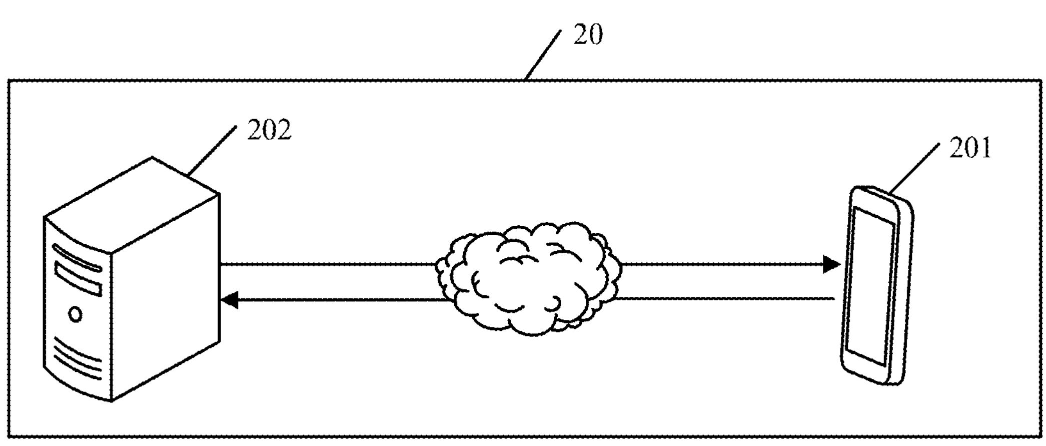
FIG. 2A is a diagram of an architecture of a data processing system of point cloud media according to some embodiments.

Based on the foregoing descriptions, a data processing system for implementing the point cloud media provided by some embodiments is introduced below with reference to FIG. 2A. As shown in FIG. 2A, a data processing system 20 for point cloud media may include a content production device 201 and a media processing device 202. The content production device 201 is located on the encoding side of the point cloud media. The content production device 201 may be a terminal device, or may be a server. The media processing device 202 is located on the decoding side of the point cloud media. The media processing device 202 may be a terminal device, or may be a server. A communication connection may be established between the content production device 201 and the media processing device 202. The terminal may be a smartphone, a tablet computer, a notebook computer, a desktop computer, a smart speaker, a smart watch, an in-vehicle terminal, a smart TV, and the like, but is not limited thereto. The server may be an independent physical server, or may be a server cluster or a distributed system formed by a plurality of physical servers, or may be a cloud server that provides cloud computing services such as a cloud service, a cloud database, cloud computing, a cloud function, cloud storage, a network service, cloud communication, a middle ware service, a domain name service, a security service, a CDN (Content Delivery Network), big data and an artificial intelligence platform.

A transmission process of the point cloud media is involved between the content production device 201 and the media processing device 202. The transmission process may be performed based on various transmission protocols (or transmission signaling). The transmission protocol may include but is not limited to: a DASH (Dynamic Adaptive Streaming over HTTP) protocol, an HLS (HTTP Live Streaming) protocol, a SMTP (Smart Media Transport Protocol), a TCP (Transmission Control Protocol), and the like.

The following describes a data processing process of the point cloud media in detail.

(1) A Process of Obtaining the Point Cloud Media

The content production device 201 may obtain the point cloud media, and the point cloud media may be obtained through two manners: scene capture or device generation. That a scene captures the point cloud media is that a real-world visual scene is collected through a capture device associated with the content production device 201 to obtain the point cloud media. The capture device is configured to provide a point cloud media obtaining service for the content production device 201, and the capture device may include but is not limited to any one of the following: a photographing device, a sensing device, and a scanning device. The photographing device may include a camera, a stereo camera, a light field camera, and the like. The sensing device may include a laser device, a radar device, and the like. The scanning device may include a three-dimensional laser scanning device, and the like. The capture device associated with the content production device 201 may be a hardware component disposed in the content production device 201, for example, the capture device is a camera, a sensor, or the like of a terminal, and the capture device associated with the content production device may be a hardware apparatus connected to the content production device 201, such as a camera connected to the content production device 201. That a device generates the point cloud media is that the content production device 201 generates the point cloud media according to a virtual object (for example, a virtual three-dimensional object and a virtual three-dimensional scene obtained through three-dimensional modeling).

(2) A Process of Encoding the Point Cloud Media

The content production device 201 may encode the geometry data and the attribute data of the obtained point cloud media by using a point cloud encoding manner, to obtain a point cloud code stream (including an encoded geometry code stream and an attribute code stream). The point cloud code stream may include one or more point cloud frames and parameter information of each point cloud frame, where the parameter information of the point cloud frame may be configured for indicating one or more of the frame serial number, the frame timestamp, the frame space information, and the intra-frame data unit information. When the parameter information of the point cloud frame is configured for indicating an intra-frame data unit, the parameter information of the point cloud frame may further include a position at which the intra-frame data unit starts to be encoded and a position at which the intra-frame data unit ends to be encoded. In addition, the parameter information of the point cloud frame may further be configured for indicating whether the point cloud frame includes a geometry header parameter set or an attribute header parameter set, so that when the point cloud frame is decoded, the media processing device 202 can correctly obtain the corresponding geometry header parameter set or attribute header parameter set for decoding.

Based on the point cloud code stream being obtained, the content production device 201 may transmit the point cloud code stream to the media processing device 202.

(3) A Process of Decoding the Point Cloud Media

The media processing device 202 may obtain the point cloud code stream of the point cloud media and corresponding media presentation description information through the content production device 201. The point cloud code stream and the media presentation description information are transmitted by the content production device 201 to the media processing device 202 through transmission signaling (for example, DASH or SMT). A decoding process of the media processing device 202 is opposite to an encoding process of the content production device 201. The media processing device 202 decodes the point cloud code stream, to restore the point cloud media.

In the decoding process, the media processing device 202 may obtain the parameter information of each point cloud frame in the point cloud code stream, and decode the point cloud code stream according to the parameter information of each point cloud frame included in the point cloud code stream, to present the point cloud media.

In some embodiments, in the decoding process, a target point cloud frame that may be decoded may be determined from the point cloud code stream, a correct geometry header parameter set and an attribute header parameter set are obtained according to whether the target point cloud frame indicated by the parameter information of the target point cloud frame includes the geometry header parameter set and the attribute header parameter set, and the target point cloud frame is decoded based on the obtained geometry header parameter set and attribute header parameter set.

In some embodiments parameter information of the target point cloud frame may include a position at which decoding of the intra-frame data unit starts and a position at which decoder sides. The data unit that may be decoded may be positioned from the target point cloud frame according to the parameter information, and the data unit may be decoded for presentation, to implement partial decoding.

(4) A Process of Rendering the Point Cloud Media

The media processing device 202 renders the decoded point cloud media according to rendering and window-related metadata in the media presentation description information, to obtain a point cloud frame of the point cloud media, and presents the point cloud media according to presentation time of the point cloud frame.

Figure 2B:
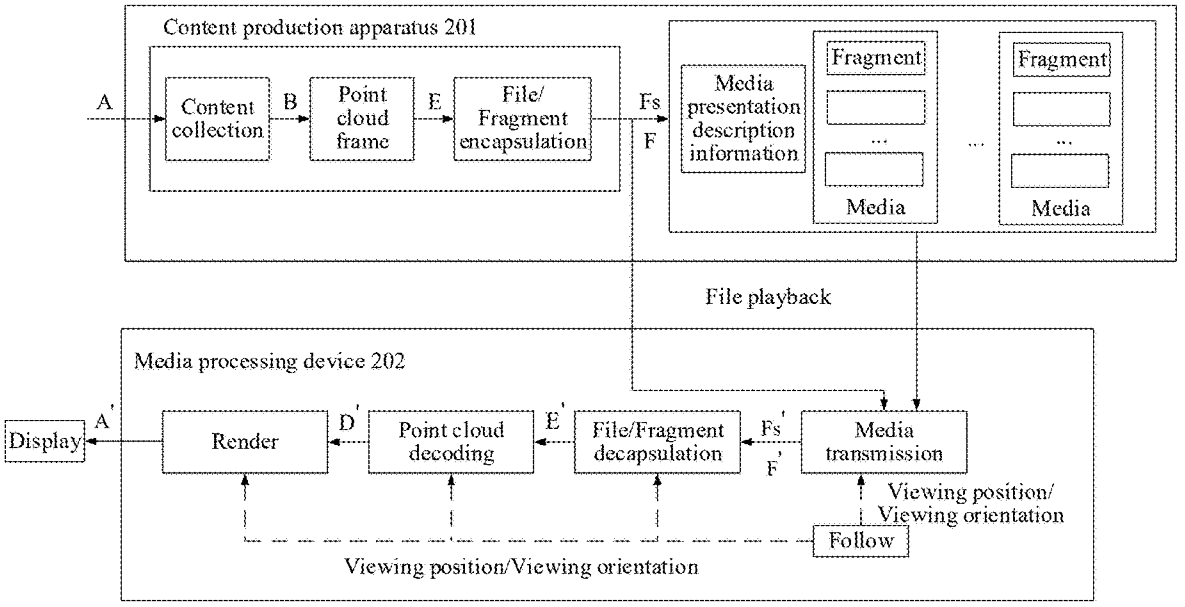
FIG. 2B is a flowchart of data processing of point cloud media according to some embodiments.

Some embodiments further provide a schematic flowchart of a data processing method of point cloud media. Referring to FIG. 2B, the content production device 201 first samples a real-world visual scene A through the acquisition device, to obtain point cloud source data B of the point cloud media corresponding to the real-world visual scene. The point cloud source data B is a frame sequence including a large number of point cloud frames. The content production device encodes the obtained point cloud media to obtain a point cloud code stream E (including the encoded geometry code stream and attribute code stream). The point cloud media includes one or more point cloud frames and the parameter information of each point cloud frame. The point cloud code stream E is encapsulated to obtain a media file corresponding to the point cloud media. The content production device 201 synthesizes one or more encoding bit streams into a media file F for file playback, or an initialization segment and a sequence of media segments (FS) for streaming transmission according to a media container file format. The media container file format may be an ISO base media file format specified in International Organization for Standardization (ISO)/International Electrotechnical Commission (IEC) 14496-12. In some embodiments, the content production device further encapsulates the metadata into a media file or a sequence of initialization/media segments, and transmits the sequence of initialization/media segments to the media processing device 202 through transmission signaling (for example, a dynamic adaptive streaming media transmission interface).

At the media processing device end, first, a media file transmitted by the content production device 201 is received. The media file may include: a media file F' for file playback, or an initialization segment and a sequence Fs' of media segments for streaming transmission. The media file is decapsulated to obtain a point cloud code stream E'. A file decapsulation process of the media processing device 202 is opposite to a file encapsulation process of the content production device 201. The media processing device 202 may decapsulate a media file resource according to a file format of the point cloud media, to obtain a point cloud code stream. According to the parameter information of each point cloud frame included in the point cloud code stream, the point cloud code stream is decoded to obtain the point cloud media D'. In some embodiments, the media processing device determines, based on a viewing position/viewing direction of a current object, a media file or a media segment sequence for presenting the point cloud media; and decodes the media file or the media segment sequence for presenting the point cloud media, to obtain the point cloud media for presenting. Finally, the decoded point cloud media is rendered based on the viewing (window) direction of the current object, to obtain a point cloud frame of the point cloud media A' and present, according to presentation time of the point cloud frame, the point cloud media on a screen of a head-mounted display or any other display device carried by the media processing device. The viewing position/viewing direction of the current object may be determined by a head following or a visual following function. In addition to being configured by a renderer to render the point cloud media of the viewing position/viewing direction of the current object, an audio decoder may further perform decoding optimization on an audio of the viewing (window) direction of the current object. In a window-based transmission process, the current viewing position and the viewing direction are also passed to a policy module and configured for determining a to-be-received track.

The data processing technology involving the point cloud media in some embodiments may be implemented based on the cloud technology. For example, a cloud server is used as the content production device. The cloud technology is a hosting technology that unifies a series of resources such as hardware, software, and networks in a wide area network or a local area network to implement computing, storage, processing, and sharing of data. The data processing technology for the point cloud media provided in some embodiments may be applied to various links in a point cloud compression-related product and an immersive system.

In some embodiments, the content production device can obtain the point cloud media and encode the point cloud media to obtain a point cloud code stream. The point cloud code stream includes one or more point cloud frames and parameter information of each point cloud frame, and encapsulates the point cloud code stream to obtain the media file of the point cloud media; and the media processing device may obtain the media file, decapsulate the media file to obtain the point cloud code stream, and decode the point cloud code stream according to the parameter information of the point cloud frame. The parameter information of each point cloud frame in the point cloud code stream may be flexibly organized to guide point cloud media decoding and presentation, to implement partial decoding at the decoder side, thereby optimizing resource overhead at the decoder side.

Figure 3:
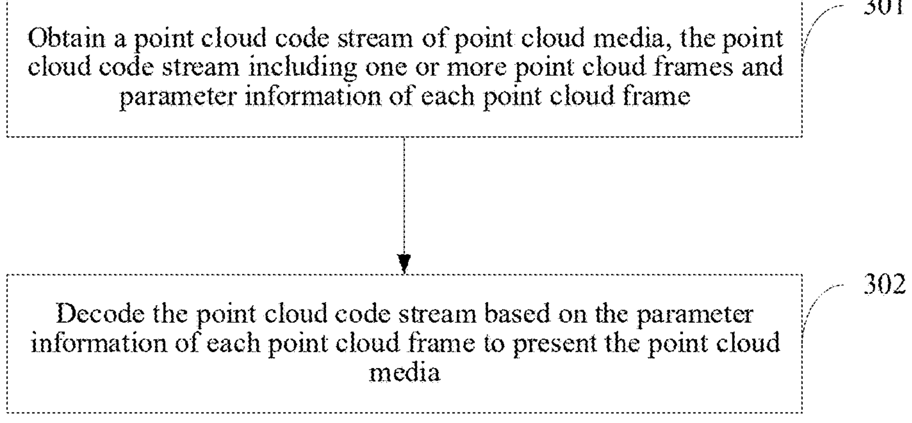
FIG. 3 is a schematic flowchart of a data processing method of point cloud media according to some embodiments.

Several descriptive fields may be added to the point cloud code stream, including field extension at a high-level syntax level of the code stream, to support implementation operations. The following describes the data processing method of point cloud media provided in some embodiments with reference to the field extension at the high-level syntax level of the code stream as an example. Referring to FIG. 3, FIG. 3 is a schematic flowchart of a data processing method of point cloud media according to some embodiments. The data processing method of point cloud media may be performed by the media processing device 202 in the data processing system of the point cloud media. The method includes the following operations 301 to 302.

301: Obtain a point cloud code stream of point cloud media, the point cloud code stream including one or more point cloud frames and parameter information of each point cloud frame.

The one or more point cloud frames in the point cloud code stream form a point cloud sequence. The parameter information of the point cloud frame belongs to frame-level parameter information. The parameter information of the point cloud frame may be configured for indicating at least one of the following information: a frame serial number, frame timestamp information, frame space information, or intra-frame data unit information. The frame serial number is a serial number of the point cloud frame in the point cloud sequence, the frame timestamp information may include any one or more of collection time, presentation time, and decoding time of the point cloud frame, the frame space information is space information of the point cloud frame, and the space information includes at least one of the following: coordinate information of an origin of a bounding box of the point cloud frame, width information of a bounding box of the point cloud frame, or depth information of a bounding box of the point cloud frame. The intra-frame data unit may include a point cloud frame, a point cloud slice, geometry data of the point cloud slice, attribute data of the point cloud slice, and the like.

In some embodiments, the parameter information of each point cloud frame may be set in a frame header (frame_header) of each point cloud frame. Syntax of the frame header of each point cloud frame is as shown in Table 10.

TABLE 10

| | •Descriptor (description) |
|---|---|
| • frame_header( ) { | |
| • frameIdx | • ue(v) |
| • numSlice | • u(4) |
| • timestampFlag | • u(1) |
| • if(timestampFlag == 1){ | • |
| • numTimestamp | • u(4) |
| • for (i=0; i< numTimestamp; i++){ | • |
| • timestampType[i] | • u(4) |
| • timestamp[i] | • ue(v) |
| • } | • |
| • } | • |
| • spatialInfoFlag | • f(1) |
| • if(spatialInfoFlag == 1){ | • |
| • | • u(16) |

TABLE 10-continued

| | •Descriptor (description) |
|---|---|
| frame_bounding_box_offset_x_upper | |
| • marker_bit | • f(1) |
| • | • u(16) |
| frame_bounding_box_offset_x_lower | |
| • marker_bit | • f(1) |
| • | • u(16) |
| frame_bounding_box_offset_y_upper | |
| • marker_bit | • f(1) |
| • | |
| frame_bounding_box_offset_y_lower | • u(16) |
| • marker_bit | • f(1) |
| • | • u(16) |
| frame_bounding_box_offset_z_upper | |
| • marker_bit | • f(1) |
| • | • u(16) |
| frame_bounding_box_offset_z_lower | |
| • marker_bit | • f(1) |
| • | • u(16) |
| frame_bounding_box_size_width_upper | |
| • marker_bit | • f(1) |
| • | • u(16) |
| frame_bounding_box_size_width_lower | |
| • marker_bit | • f(1) |
| • | • u(16) |
| frame_bounding_box_size_height_upper | |
| • marker_bit | • f(1) |
| • | • u(16) |
| frame_bounding_box_size_height_lower | |
| • marker_bit | • f(1) |
| • | • u(16) |
| frame_bounding_box_size_depth_upper | |
| • marker_bit | • f(1) |
| • | • u(16) |
| frame_bounding_box_size_depth_lower | |
| • marker_bit | • f(1) |
| • } | • |
| • byte_alignment( ) | • |
| • } | • |

How the parameter information of the point cloud frame indicates the corresponding information is described in detail below with reference to the syntax of the frame header shown in Table 10. In some embodiments, a current point cloud frame is used as an example for description. The current point cloud frame is a point cloud frame that is being decoded in the point cloud code stream:

(1) The parameter information of the point cloud frame is configured for indicating the frame serial number.

The parameter information of the current point cloud frame may include a frame serial number field (frameIdx), and the frame serial number field may indicate a serial number of the current point cloud frame in the point cloud sequence.

(2) The parameter information of the point cloud frame is configured for indicating the intra-frame data unit information.

A point cloud frame may include one or more data units. In some embodiments, the data unit may be a point cloud slice in the point cloud frame, and the parameter information of the current point cloud frame includes a number of point cloud slices field (numSlice) or a number of point cloud slices minus one field (numSliceMinus1). The number of point cloud slices field is configured for indicating a number of point cloud slices included in the current point cloud frame; and the number of point cloud slices minus one field is configured for indirectly indicating the number of point cloud slices included in the current point cloud frame, for example, the number of point cloud slices included in the current point cloud frame is numSliceMinus1+1.

(3) The parameter information of the point cloud frame is configured for indicating the frame timestamp information.

The collection time, the decoding time, or the presentation time of the point cloud frame may be determined according to the frame timestamp information, to facilitate the point cloud frame being decoded within appropriate time. The parameter information of the current point cloud frame includes at least one of the following fields: a timestamp identifier field (timestampFlag), a number of timestamps field (numTimestamp), a timestamp type field (timestampType), or a timestamp field (Timestamp).

The timestamp identifier field (timestampFlag) is configured for indicating whether the current point cloud frame includes a timestamp, and when a value of the timestamp identifier field is a first preset value (such as 0), it indicates that the current point cloud frame does not include the timestamp; and when the value of the timestamp identifier field is a second preset value (such as 1), it indicates that the current point cloud frame includes the timestamp.

The number of timestamps field (numTimestamp) is configured for indicating a number of timestamps included in the current point cloud frame.

The timestamp type field (timestampType) is configured for indicating a type of a current timestamp, and if a value of the timestamp type field is a first preset value (such as 0), it indicates that the type of the current timestamp is decoding time; if the value of the timestamp type field is a second preset value (such as 1), it indicates that the type of the current timestamp is presentation time; and if the value of the timestamp type field is a third preset value (such as 2), it indicates that the type of the current timestamp is collection time. The current timestamp is a timestamp being used by the current point cloud frame.

The timestamp field (Timestamp) is configured for indicating any one or more of the collection time, the presentation time, and the decoding time of the current point cloud frame. In some embodiments, the timestamp field is configured for indicating universal time coordinated (for example, UTC time); and in some embodiments, the timestamp field indicates according to a preset format. The preset format may be a 32-bit bit string, and the preset format includes at least one of the following fields: a year timestamp field (Timestamp Year), an hour timestamp field (TimestampHours), a second timestamp field (TimestampMinutes), or a frame timestamp field (TimestampFrames). The year timestamp field, the hour timestamp field, the second timestamp field, and the frame timestamp field are all unsigned integer fields. For example, an example in which the timestamp field indicates the collection time of the current point cloud frame is used. A preset format of the timestamp field may be as shown in Table 11.

TABLE 11

| Timestamp field | Value | Unit | Descriptor |
|---|---|---|---|
| TimestampYear | 0 to 511 | A value of 0 represents that the field is meaningless; when the value is a non-0 value, 1900 + TimeStampYear is a year of point cloud frame collection time. A default value of the field is 0, and | u(9) |

TABLE 11-continued

| Timestamp field | Value | Unit | Descriptor |
|---|---|---|---|
| | | when the collection time is represented, the value is non-0. | |
| TimestampHours | 0 to 23 | Hour (h) | u(5) |
| TimestampMinutes | 0 to 59 | Minute (min) | u(6) |
| TimestampSeconds | 0 to 59 | Second (s) | u(6) |
| TimestampFrames | 0 to 63 | If the frame rate is less than 64, the unit is a frame. Otherwise, the unit is 1/64 s. | u(6) |

(4) The parameter information of the point cloud frame is configured for indicating the frame space information.

The parameter information of the current point cloud frame includes a space information identifier field (spatialInfoFlag). The space information identifier field represents whether to indicate the space information of the current point cloud frame. When a value of the space information identifier field is a first value (such as 1), it indicates the space information of the current point cloud frame; and when the value of the space information identifier field is a second value (such as 0), it does not indicate the space information of the current point cloud frame.

The space information includes at least one of the following: coordinate information of an origin of a bounding box of the current point cloud frame, width information of the bounding box of the current point cloud frame, or depth information of the bounding box of the current point cloud frame. The coordinate information of the origin of the current bounding box of the point cloud frame may include an x-coordinate of the origin of the bounding box of the point cloud frame, a y-coordinate of the origin of the bounding box of the point cloud frame, and a z coordinate of the origin of the bounding box of the point cloud frame.

Point cloud frame bounding box origin x-coordinate upper bit part field (frame_bounding_box_offset_x_upper): This field is an unsigned integer, and the field represents a number of bits higher than 16 bits in the x-coordinate of the bounding box.

Point cloud frame bounding box origin x-coordinate lower bit part field (frame_bounding_box_offset_x_lower): This field is an unsigned integer, and the field represents a number of bits lower than 16 bits in the x-coordinate of the origin of the bounding box. In this case, the x-coordinate of the origin of the bounding box of the point cloud frame is:

frame_bounding_box_offset_x = (frame_bounding_box_offset_x_upper)<< 16 + frame_bounding_box_offset_x_lower.

Point cloud frame bounding box origin y-coordinate upper bit part field (frame_bounding_box_offset_y_upper): This field is an unsigned integer, and the field represents a number of bits higher than 16 bits in the y-coordinate of the bounding box.

Point cloud frame bounding box origin y-coordinate lower bit part field (frame_bounding_box_offset_y_lower): This field is an unsigned integer and represents a number of bits lower than 16 bits in the y-coordinate of the origin of the bounding box. The y-coordinate of the origin of the bounding box of the point cloud frame is:

frame_bounding_box_offset_y = (frame_bounding_box_offset_y_upper)<< 16 + frame_bounding_box_offset_y_lower.

Point cloud frame bounding box origin z-coordinate upper bit part field (frame_bounding_box_offset_z_upper): This field is an unsigned integer and represents a number of bits higher than 16 bits in the z-coordinate of the bounding box.

Point cloud frame bounding box origin z-coordinate lower bit part field (frame_bounding_box_offset_z_lower): This field is an unsigned integer and represents a number of bits lower than 16 bits in the z-coordinate of the origin of the bounding box. The z-coordinate of the origin of the bounding box of the point cloud frame is:

frame_bounding_box_offset_z = (frame_bounding_box_offset_z_upper)<< 16 + frame_bounding_box_offset_z_lower.

Point cloud frame bounding box width upper bit part field (bounding_box_size_width_upper): This field is an unsigned integer and configured for representing a number of bits higher than 16 bits of the width of the bounding box.

Point cloud frame bounding box width lower bit part field (frame_bounding_box_size_width_lower): This field is an unsigned integer, and the field represents a number of bits lower than 16 bits of the width of the bounding box. The width of the bounding box of the point cloud frame is:

frame_bounding_box_size_width = (frame_bounding_box_size_width_upper)<< 16 + frame_bounding_box_size_width_lower.

Point cloud frame bounding box height upper bit part field (frame_bounding_box_size_height_upper): This field is an unsigned integer and represents a number of bits higher than 16 bits of the height of the bounding box.

Point cloud frame bounding box height lower bit part field (frame_bounding_box_size_height_lower): This field is an unsigned integer and represents a number of bits lower than 16 bits of the height of the bounding box. The height of the bounding box of the point cloud frame is:

$$frame\_bounding\_box\_size\_height = (frame\_bounding\_box\_size\_height\_upper) << 16 + frame\_bounding\_box\_size\_height\_lower.$$

Point cloud frame bounding box depth upper bit part field (frame_bounding_box_size_depth_upper): This field is an unsigned integer and represents a number of bits higher than 16 bits of the depth of the bounding box.

Point cloud frame bounding box depth lower bit part field (frame_bounding_box_size_depth_lower): This field is an unsigned integer and represents a number of bits lower than 16 bits of the depth of the bounding box. The depth of the bounding box of the point cloud frame is:

$$frame\_bounding\_box\_size\_depth = (frame\_bounding\_box\_size\_depth\_upper) << 16 + frame\_bounding\_box\_size\_depth\_lower.$$

(5) The parameter information of the point cloud frame may be further configured for indicating whether the point cloud frame includes the parameter set.

The parameter set includes any one of the following: a geometry header parameter set, an attribute header parameter set, or a geometry header parameter set and an attribute header parameter set. In this case, the parameter information of the current point cloud frame may include any one of the following fields: a geometry header identifier field, an attribute header identifier field, or a number of attributes minus one field. The syntax of the parameter information of the point cloud frame may be shown in Table 12.

TABLE 12

| | Descriptor |
|---|---|
| frame_header( ) { | |
| frameIdx | ue(v) |
| numSlice | u(4) |
| timestampFlag | u(1) |
| ... ... | u(16) |
| geo_header_flag | u(1) |
| attr_header_flag | u(1) |
| if(attr_header_flag == 1){ | |
| numAttributesMinus1 | |
| } | |
| byte_alignment( ) | |
| } | |

A meaning of each field in Table 12 above is as follows.

Geometry header identifier field (geo_header_flag): The geometry header identifier field is configured for indicating whether the current point cloud frame includes the geometry header parameter set. If a value of the geometry header identifier field is a first preset value (such as 1), it indicates that the current point cloud frame includes the geometry header parameter set; and if the value of the geometry header identifier field is a second preset value (such as 0), it indicates that the current point cloud frame does not include the geometry header parameter set.

In some embodiments, when the current point cloud frame is a first frame in the point cloud sequence, the geometry header identifier field is to be set to the first preset value. For example, when the point cloud frame is the first frame in the point cloud sequence, the current point cloud frame is to include the geometry header parameter set. When the current point cloud frame is not the first frame in the point cloud sequence, the current point cloud frame may not include the geometry header parameter set. In this case, a geometry header parameter included in the first frame may be valid for the current point cloud frame, for example, the geometry header parameter set included in the first frame in the point cloud sequence may be used when the geometry data in the current point cloud frame is decoded. In some embodiments, when the current point cloud frame is not the first frame in the point cloud sequence, the current point cloud frame may also include the geometry header parameter set, for example, if the geometry header identifier field is set to the first preset value, it indicates that the geometry header parameter set in the point cloud sequence is updated. In this case, when decoding is performed, the point cloud frames with serial numbers behind the current point cloud frame in the point cloud sequence use an updated geometry header parameter set.

For example, in the point cloud sequence, a point cloud frame 1, a point cloud frame 2, and a point cloud frame 3 are sequentially in order, for example, the point cloud frame 1 is the first frame in the point cloud sequence. In this case, for the point cloud frame 1, the value of the geometry header identifier field is to be set to the first preset value, for example, the point cloud frame 1 is to include the geometry header parameter set. For the point cloud frame 2, the point cloud frame 2 is not the first frame in the point cloud sequence (for example, it is a second frame in the point cloud sequence). When the value of the geometry header identifier field is the first preset value, it indicates that the point cloud frame 2 includes the geometry header parameter set, which means that the geometry header parameter set in the point cloud sequence is updated. For the point cloud frame 3, the point cloud frame 3 is a third frame in the point cloud sequence. When the value of the geometry header identifier field is the second preset value, it indicates that the point cloud frame 3 does not include the geometry header parameter set. When the point cloud frame 3 is decoded, an updated geometry header parameter set may be used.

Attribute header identifier field (attr_header_flag): The attribute header identifier field is configured for indicating whether the current point cloud frame includes the attribute header parameter set, and if a value of the attribute header identifier field is a first set value (such as 1), it indicates that the current point cloud frame includes the attribute header parameter set; and if the value of the attribute header identifier field is a second set value (such as 0), it indicates that the current point cloud frame does not include the attribute header parameter set.

In some embodiments, when the current point cloud frame is the first frame in the point cloud sequence, the value of the attribute header identifier field is to be set to a first set value. For example, when the point cloud frame is the first frame in the point cloud sequence, the current point cloud frame is to include the attribute header parameter set. When the current point cloud frame is not the first frame in the point cloud sequence, the current point cloud frame may not include the attribute header parameter set. In this case, an attribute header parameter included in the first frame may be valid for the current point cloud frame, for example, the attribute header parameter set included in the first frame in the point cloud sequence may be used when the attribute data in the current point cloud frame is decoded. In some embodiments, when the current point cloud frame is not the first frame in the point cloud sequence, the current point cloud frame may also include the attribute header parameter set, for example, if the value of the attribute header identifier field is set to the first preset value, it indicates that the attribute header parameter set in the point cloud sequence is updated, and the point cloud frames with serial numbers behind the current point cloud frame in the point cloud sequence use an updated attribute header parameter set.

For example, in the point cloud sequence, a point cloud frame 1, a point cloud frame 2, and a point cloud frame 3 are sequentially in order, for example, the point cloud frame 1 is the first frame in the point cloud sequence. In this case, for the point cloud frame 1, the value of the attribute header identifier field is to be set to the first set value, for example, the point cloud frame 1 is to include the attribute header parameter set. For the point cloud frame 2, the point cloud frame 2 is not the first frame in the point cloud sequence (for example, it is a second frame in the point cloud sequence). When the attribute header identifier field is the first set value, it indicates that the point cloud frame 2 includes the attribute header parameter set, which means that the attribute header parameter set in the point cloud sequence is updated. For the point cloud frame 3, the point cloud frame 3 is a third frame in the point cloud sequence. When the value of the attribute header identifier field is the second set value, it indicates that the point cloud frame 3 does not include the attribute header parameter set. When the point cloud frame 3 is decoded, an updated attribute header parameter set may be used.

Number of attributes minus one field (numAttributesMinus1): This field is configured for indicating a number of attribute data groups corresponding to the attribute header parameter set included in the current point cloud frame. When the current point cloud frame is the first frame in the point cloud sequence, a value of the number of attributes minus one field is a maximum number of attribute data groups included in the point cloud sequence. The maximum number of attribute data groups included in the point cloud sequence may be understood as a number of all attribute data groups in the point cloud sequence. For example, if the point cloud sequence includes a maximum of five groups of attribute data, when the current point cloud frame is the first frame in the point cloud sequence, the value of the number of attributes minus one field is 5; and for another example, if the point cloud sequence includes a maximum of ten groups of attribute data, when the current point cloud frame is the first frame in the point cloud sequence, the value of the number of attributes minus one field is 10.

In some embodiments, when the point cloud frame which is not the first frame includes the geometry header parameter set or the attribute header parameter set, it represents that the geometry header parameter set or the attribute header parameter set is updated, and the updated geometry header parameter set or attribute header parameter set can replace the corresponding geometry header parameter set and attribute header parameter set in the point cloud sequence. In the point cloud media, a group of attribute data corresponds to an attribute header parameter set; and a point cloud frame can include one or more attribute header parameter sets, and an attribute header parameter set can correspond to one or more groups of attribute data. For the attribute header parameter set, because different attribute data groups may correspond to different attribute header parameter sets, the parameters in the attribute header parameter set may be partially updated. Therefore, in this case, some embodiments at least use the following three methods (for example, a method A, a method B, and a method C) to establish a correspondence between the attribute header parameter set and the attribute data.

Method A: When a point cloud frame includes an attribute header parameter set, for example, the number of attribute header parameter sets in the point cloud frame is one. In this case, the attribute data groups in the point cloud media all refer to this attribute header parameter set when decoding is performed. The attribute header parameter set may include the attribute present identifier field. In this case, the syntax of the attribute header parameter set is shown in Table 13.

TABLE 13

| | Descriptor |
|---|---|
| attribute_header( ) { | |
| for (attrIdx = 0;attrIdx< | |
| (maxNumAttributesMinus1 + 1);attrIdx++){ | |
| attributePresentFlag[attrIdx] | u(1) |
| if(attributePresentFlag[attrIdx]){ | |
| ...... ...... | |
| } | |
| } | |
| byte_alignment() | |
| } | |

Attribute present identifier field (attributePresentFlag[attrIdx]): This field is a binary variable, and the attribute present identifier field is configured for indicating whether the current attribute header parameter set includes an encoding parameter of an $x^{th}$ (or attrIdx) group of attribute data. If a value of the attribute present identifier field is a first value (such as 1), it indicates that the current attribute header parameter set includes the encoding parameter of the $x^{th}$ group of attribute data; and if the value of the attribute present identifier field is a second value (such as 0), it indicates that the current attribute header parameter set does not include the encoding parameter of the $x^{th}$ group of attribute data. x (or attrIdx) is an integer greater than or equal to 0 and less than or equal to 15. The meaning of x is shown in Table 14 below.

TABLE 14

| x attribute encoding mapping table | |
|---|---|
| attrIdx (or x) | Attribute description |
| 0 | Color |
| 1 | Reflectance |
| 2 . . . 15 | Reserved |

Method B: When a point cloud frame includes an attribute header parameter set, for example, the number of attribute header parameter sets in the point cloud frame is one, a correspondence between the attribute encoding parameter and the attribute data can be established through the attribute type field and the attribute data identifier. The attribute header parameter set includes the attribute type field and the attribute data identifier field, and a correspondence between the attribute header parameter set and the attribute data is represented through the attribute type field and the attribute data identifier field. In this case, the syntax of the attribute header parameter set is shown in Table 15.

TABLE 15

| | Descriptor |
|---|---|
| attribute_header( ) { | |
| for(attrIdx=0;attrIdx< | |
| (numAttributesMinus1+1); attrIdx ++){ | |

TABLE 15-continued

| | Descriptor |
|---|---|
| attributeType [attrIdx] | u(4) |
| attributeID [attrIdx] | u(8) |
| ...... ...... | |
| } | |
| byte_alignment( ) | |
| } | |

A meaning of each field in Table 15 is as follows.

Number of attributes minus one field (numAttributesMinus1): This field is configured for indicating a number of attribute data groups corresponding to the attribute header parameter set included in the current point cloud frame. When the current point cloud frame is the first frame in the point cloud sequence, a value of the number of attributes minus one field is a maximum number of attribute data groups included in the point cloud sequence.

Attribute encoding parameter type field (attributeType): This field may be configured for indicating a type of attribute header parameter set.

Attribute data identifier field (attributeID): This field is configured for indicating the attribute data.

Method C: When there are a plurality of attribute header parameter sets for a point cloud frame, such as numAttributesMinus1 attribute header parameter sets included in the point cloud frame, different attribute data in the point cloud frame may refer to different attribute header parameter sets when decoding is performed. For example, if numAttributesMinus1=2, two attribute header parameter sets are included in the point cloud frame, an attribute header parameter set 1 and an attribute header parameter set 2 exist for the point cloud frame, attribute data 1 in the point cloud frame refers to the attribute header parameter set 1 when decoding is performed, and the attribute data 2 in the point cloud frame refers to the attribute header parameter set 2 when decoding is performed. In this case, the correspondence between the attribute encoding parameter and the attribute data may be established through the attribute type field and the attribute data identifier field. The attribute header parameter set includes the attribute type field and the attribute data identifier field, and a correspondence between the attribute header parameter set and the attribute data is represented through the attribute type field and the attribute data identifier field. The syntax of the attribute header parameter set may be shown in Table 16.

TABLE 16

| | Descriptor |
|---|---|
| attribute_header( ) { | |
| attributeType [attrIdx] | u(4) |
| attributeID [attrIdx] | u(8) |
| ...... ...... | |
| byte_alignment( ) | |
| } | |

(6) The parameter information of the point cloud frame may further be configured for indicating a start code and an end code of the intra-frame data unit to achieve rapid positioning.

Figure 4:
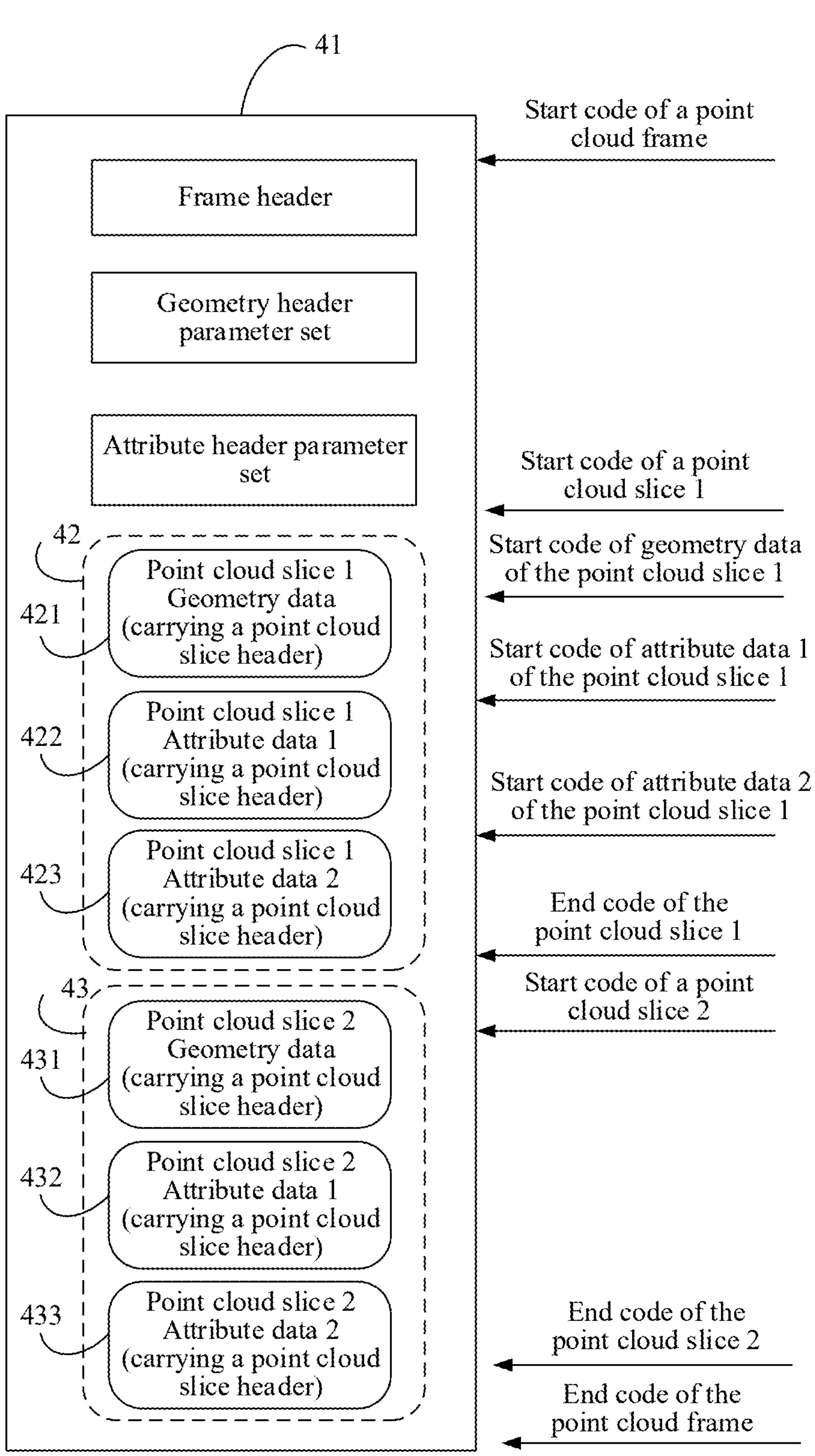
FIG. 4 is a schematic diagram of a data unit included in a point cloud frame according to some embodiments.

The point cloud frame may include one or more data units. The data unit may include a point cloud frame, a point cloud slice, geometry data of the point cloud slice, attribute data of the point cloud slice, and the like. For example, as shown in FIG. 4, FIG. 4 is a data unit included in the point cloud frame provided in some embodiments. In FIG. 4, the point cloud frame may include a data unit 41, a data unit 42, a data unit 43, a data unit 421, a data unit 422, a data unit 423, a data unit 431, a data unit 432, and a data unit 433. The data unit 41 is the point cloud frame. The data unit 41 includes a header of the point cloud frame, a geometry header parameter set, an attribute header parameter set, and a point cloud slice. The data unit 42 is a point cloud slice 1. The data unit 43 is a point cloud slice 2. The data unit 421 is geometry data of the point cloud slice 1; the data unit 422 is attribute data 1 (attr1) of the point cloud slice 1; and the data unit 423 is attribute data 2 (attr2) of the point cloud slice 1. The data unit 431 is geometry data of the point cloud slice 2; the data unit 432 is attribute data 1 (attr1) of the point cloud slice 2; and the data unit 433 is attribute data 2 (attr2) of the point cloud slice 2.

How the parameter information of the point cloud frame indicates the start code and the end code of the intra-frame data unit is described.

(1) If the data unit includes the point cloud frame, the parameter information of the current point cloud frame may include a start code and an end code of the current point cloud frame; the current point cloud frame is a point cloud frame being decoded in the point cloud code stream; the start code of the current point cloud frame is a preset bit string, or the start code of the current point cloud frame is an end code of a previous point cloud frame of the current point cloud frame; and the start code of the current point cloud frame is configured for indicating a position at which decoding of the current point cloud frame starts, and the end code of the current point cloud frame is configured for indicating a position at which the decoding of the current point cloud frame ends.

(2) If the data unit includes the point cloud slice, the parameter information of the current point cloud frame includes a start code and an end code of a current point cloud slice in the current point cloud frame, and the current point cloud slice is a point cloud slice being decoded in the point cloud code stream; and the start code of the current point cloud slice is configured for indicating a position at which decoding of the current point cloud slice starts, and the end code of the current point cloud slice is configured for indicating a position at which the decoding of the current point cloud slice ends.

The start code of the current point cloud slice is a preset bit string, or the start code of the current point cloud slice is an end code of a previous point cloud slice of the current point cloud slice. For example, in FIG. 4, the current point cloud slice is the point cloud slice 2, and a start code of the point cloud slice 2 may be an end code of the previous point cloud slice of the point cloud slice 2 (for example, an end code of the point cloud slice 1 in FIG. 4).

(3) The point cloud slice may include the geometry data of the point cloud frame. If the data unit includes the geometry data of the point cloud slice, the parameter information of the current point cloud frame includes a start code and an end code of the geometry data of the current point cloud slice, and the geometry data of the current point cloud slice is the geometry data of the current point cloud slice that is being decoded. The start code of the geometry data of the current point cloud slice is configured for indicating a position at which decoding of the geometry data of the current point cloud slice starts, and the end code of the geometry data of the current point cloud slice is configured for indicating a position at which the decoding of the geometry data of the current point cloud slice ends.

In some embodiments, the start code of the geometry data of the current point cloud slice may be a preset bit string. In some embodiments, the start code of the geometry data of the current point cloud slice may be an end code of a previous point cloud slice of the current point cloud slice. For example, in FIG. 4, the geometry data of the current point cloud slice is geometry data of the point cloud slice 2, and a start code of the geometry data of the current point cloud slice may be an end code of the previous point cloud slice (for example, the point cloud slice 1) of the point cloud slice 2 (for example, the end code of the point cloud slice 1 in FIG. 4).

(4) The point cloud slice may further include one or more groups of attribute data of the point cloud frame. If the data unit includes the attribute data of the point cloud slice, the parameter information of the current point cloud frame includes a start code and an end code of current attribute data of the current point cloud slice, and the current attribute data of the current point cloud slice is attribute data being decoded in the current point cloud slice. The start code of the current attribute data of the current point cloud slice is configured for indicating a position at which decoding of the current attribute data of the current point cloud slice starts, and the end code of the current attribute data of the current point cloud slice is configured for indicating a position at which the decoding of the current attribute data of the current point cloud slice ends.

In some embodiments, the start code of the current attribute data of the current point cloud slice may be a preset bit string. In some embodiments, the start code of the current attribute data of the current point cloud slice may be an end code of previous attribute data of the current attribute data. For example, as shown in FIG. 4, if the current point cloud slice is the point cloud slice 1, and the current attribute data of the current point cloud slice is the attribute data 2 in the point cloud slice 1, the previous attribute data may be the attribute data 1 in the point cloud slice 1; and correspondingly, the start code of the current attribute data of the current point cloud slice is the end code of the attribute data 1 of the point cloud slice 1.

In some embodiments, the start code of the current attribute data of the current point cloud slice may be an end code of the geometry data of the current point cloud slice. For example, as shown in FIG. 4, if the current point cloud slice is the point cloud slice 1, and the current attribute data of the current point cloud slice is the attribute data 1 in the point cloud slice 1, the start code of the current attribute data of the current point cloud slice is an end code of the geometry data of the point cloud slice 1.

In a bit stream conforming to the present code stream, the foregoing preset bit string is not to occur in any case except the start code in (1) to (4). The start code is a bit string including a start code prefix and a start code value, all start codes are to be byte aligned. The start code prefix may be a bit string '0000 0000 0000 0000 0000 0001', and the start code value is an 8-bit integer to indicate a type of the start code, for example, the start code of the point cloud slice may be 0000 0000 0000 0000 0000 000100; and for another example, the start code of the geometry data of the point cloud slice may be 0000 0000 0000 0000 0000 000180. A start code value can be shown in Table 17.

TABLE 17

Start code value

| Type of the start code | Start code value (hexadecimal) |
|---|---|
| Point cloud slice start code (slice_start_code) | 00 to 7F |
| Geometry data start code of a point cloud slice | 80 to 87 |
| Attribute data start code of a point cloud slice | 88 to 8E |
| Point cloud slice end code (slice_end_code) | 8F |
| Reserved | 90 to AF |
| Point cloud sequence start code (sequence_start_code) | B0 |
| Point cloud sequence end code (sequence_end_code) | B1 |
| Point cloud frame start code (frame_start_code) | B2 |
| Point cloud frame end code (frame_end_code) | B3 |
| Geometry data end code of a point cloud slice | B4 |
| Attribute data end code of a point cloud slice | B5 |
| Reserved | B6 to FF |

In some embodiments, the start code of the current attribute data of the current point cloud slice may be configured for indicating a type of the current attribute data of the current point cloud slice. For example, a start code 88 of the current attribute data of the current point cloud slice is configured for indicating that the type of the current attribute data of the current point cloud slice is a color; a start code 89 of the current attribute data of the current point cloud slice is configured for indicating that the type of the current attribute data of the current point cloud slice is a reflectance; a start code 8A of the current attribute data of the current point cloud slice is configured for indicating that the type of the current attribute data of the current point cloud slice is a color enabling cross-attribute prediction; and a start code 8B of the current attribute data of the current point cloud slice is configured for indicating that the type of the current attribute data of the current point cloud slice is a reflectance enabling cross-attribute prediction.

302: Decode the point cloud code stream based on the parameter information of each point cloud frame to present the point cloud media.

A point cloud frame includes one or more data units, and the decoding the point cloud code stream to present the point cloud media according to the parameter information of each point cloud frame may include: determining a target point cloud frame that may be decoded from the point cloud code stream; positioning a data unit that may be decoded in the target point cloud frame according to parameter information of the target point cloud frame; and decoding and presenting the data unit that may be decoded in the target point cloud frame. The parameter information of the target point cloud frame includes a start code and an end code of the intra-frame data unit, and the data unit that may be decoded can be quickly positioned according to the start code and the end code of the intra-frame data unit, so that partial decoding can be achieved.

In some embodiments, the parameter information of the target point cloud frame is configured for indicating time-stamp information and a frame serial number, a target point cloud frame that may be decoded may be determined from the point cloud code stream according to the frame serial number, and the target point cloud frame is decoded according to the timestamp information indicated by the parameter information of the target point cloud frame, to implement decoding and presentation of the point cloud media in sequence.

In some embodiments, the parameter information of the target point cloud frame is configured for indicating whether the target point cloud frame includes a parameter set, a corresponding parameter set is obtained according to the parameter information of the target point cloud frame, and the target point cloud frame is decoded according to the parameter set, a flexible indication number set may facilitate the point cloud frame being decoded correctly, and also can reduce burden on the decoding side by carrying the geometry header parameter set and the attribute header parameter set in each point cloud frame when the parameter set is fixed.

In some embodiments, the point cloud code stream of the point cloud media is obtained, and the point cloud code stream includes one or more point cloud frames and the parameter information of each point cloud frame; and according to the parameter information of each point cloud frame, the point cloud code stream is decoded to present the point cloud media, so that the parameter information in the point cloud code stream can be flexibly organized to guide the decoding and presentation of the point cloud media, thereby optimizing the resource overhead of the decoder side.

Figure 5:
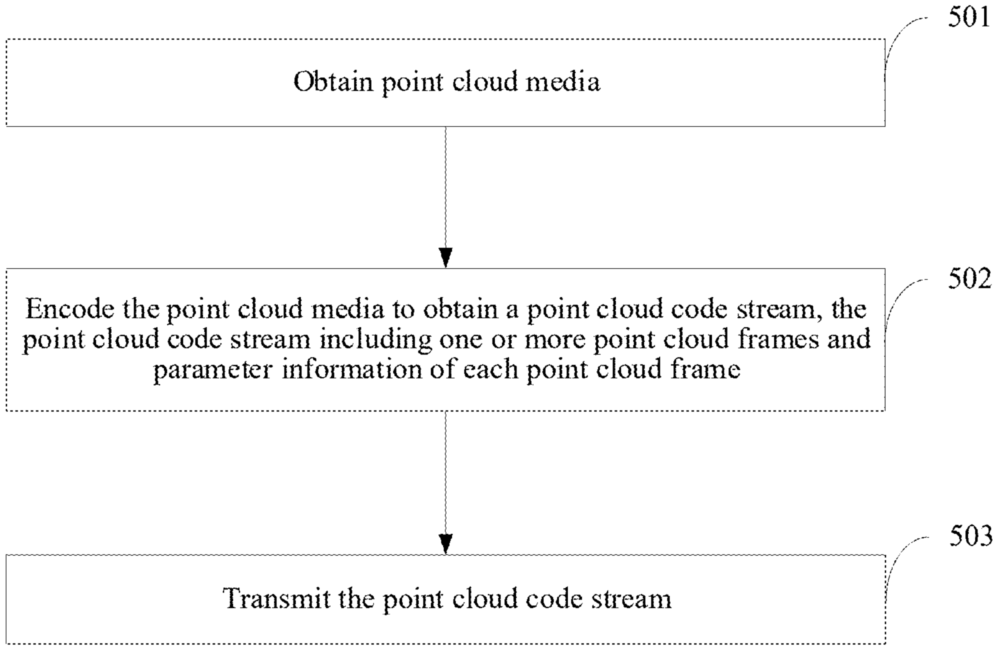
FIG. 5 is a schematic flowchart of a data processing method of point cloud media according to some embodiments.

Referring to FIG. 5, FIG. 5 is a schematic flowchart of another data processing method of point cloud media according to some embodiments. The data processing method of point cloud media may be performed by the content production device 201 in the foregoing data processing system of point cloud media. The data processing method of point cloud media described in some embodiments may include the following operations 501 to 503.

501: Obtain point cloud media.

For implementation details of operation 501, refer to the descriptions above.

502: Encode the point cloud media to obtain a point cloud code stream, the point cloud code stream including one or more point cloud frames and parameter information of each point cloud frame.

When the point cloud media is encoded, the parameter information of each point cloud frame may be set at a frame header of each point cloud frame. The parameter information of the point cloud frame is configured for indicating at least one of the following information: a frame serial number, frame timestamp information, frame space information, or intra-frame data unit information. Information indicated by the parameter information is described by using the current point cloud frame as an example, and the current point cloud frame is a point cloud frame being encoded.

(1) The parameter information of the point cloud frame is configured for indicating the frame serial number.

One or more point cloud frames in the point cloud code stream form a point cloud sequence, the parameter information of the current point cloud frame includes a frame serial number field, and the frame serial number field is configured for indicating a serial number of the current point cloud frame in the point cloud sequence.

(2) The parameter information of the point cloud frame is configured for indicating the frame timestamp information.

The parameter information of the current point cloud frame includes at least one of the following fields: a timestamp identifier field, a number of timestamps field, a timestamp type field, or a timestamp field.

The timestamp identifier field is configured for indicating whether the current point cloud frame includes a timestamp. When the current point cloud frame does not include the timestamp, a value of the timestamp identifier field is set to a first preset value (such as 0); and when the current point cloud frame includes the timestamp, the value of the timestamp identifier field is set to a second preset value (such as 1).

The number of timestamps field is configured for indicating a number of timestamps included in the current point cloud frame.

The timestamp type field is configured for indicating the type of a current timestamp. If the type of the current timestamp is encoding time, a value of the timestamp type field is set to a first preset value (such as 0); if the type of the current timestamp is presentation time, the value of the timestamp type field is set to a second preset value (such as 1); and if the type of the current timestamp is collection time, the value of the timestamp type field is set to a third preset value (such as 2).

The timestamp field is configured for indicating any one or more of the collection time, the presentation time, and the encoding time of the current point cloud frame. In some embodiments, the timestamp field is configured for indicating universal time coordinated (UCT time). In some embodiments, the timestamp field indicates according to a preset format. The preset format includes at least one of the following fields: a year timestamp field, an hour timestamp field, a second timestamp field, or a frame timestamp field. The current timestamp is a timestamp being used by the current point cloud frame.

(3) The parameter information of the point cloud frame is configured for indicating the frame space information.

The parameter information of the current point cloud frame includes a space information identifier field; and The space information identifier field represents whether to indicate space information of the current point cloud frame. When the space information identifier field indicates the space information of the current point cloud frame, a value of the space information identifier field is set to a first value (such as 1); and when the space information identifier field does not indicate the space information of the current point cloud frame, the value of the space information identifier field is set to a second value (such as 0). The space information includes at least one of the following: coordinate information of an origin of a bounding box of the current point cloud frame, width information of the bounding box of the current point cloud frame, or depth information of the bounding box of the current point cloud frame.

(4) The parameter information of the point cloud frame is configured for indicating the intra-frame data unit information.

A point cloud frame includes one or more data units, and the data unit includes a point cloud slice; the parameter information of the current point cloud frame includes a number of point cloud slices field or a number of point cloud slices minus one field; the number of point cloud slices field is configured for indicating a number of point cloud slices included in the current point cloud frame; and the number of point cloud slices minus one field is configured for indirectly indicating the number of point cloud slices included in the current point cloud frame.

(5) The parameter information of the point cloud frame is configured for indicating a start code and an end code of the intra-frame data unit. The data unit may include a point cloud frame, a point cloud slice, geometry data of the point cloud slice, attribute data of the point cloud slice, and the like. The geometry data of the point cloud slice is the geometry data included in the point cloud slice, and the attribute data of the point cloud slice is understandable as the attribute data of the point cloud slice.

(1) If the data unit includes the point cloud frame, the parameter information of the current point cloud frame may include a start code and an end code of the current point cloud frame; the current point cloud frame is a point cloud frame being encoded in the point cloud code stream; the start code of the current point cloud frame is a preset bit string, or the start code of the current point cloud frame is an end code of a previous point cloud frame of the current point cloud frame; and the start code of the current point cloud frame is configured for indicating a position at which encoding of the current point cloud frame starts, and the end code of the current point cloud frame is configured for indicating a position at which the encoding of the current point cloud frame ends.

(2) If the data unit includes the point cloud slice, the parameter information of the current point cloud frame includes a start code and an end code of the current point cloud slice in the current point cloud frame, and the current point cloud slice is a point cloud slice being encoded in the point cloud code stream. The start code of the current point cloud slice is a preset bit string, or the start code of the current point cloud slice is an end code of a previous point cloud slice of the current point cloud slice; and the start code of the current point cloud slice is configured for indicating a position at which encoding of the current point cloud slice starts, and the end code of the current point cloud slice is configured for indicating a position at which the encoding of the current point cloud slice ends.

(3) If the data unit includes the geometry data of the point cloud slice, the parameter information of the current point cloud frame includes a start code and an end code of the geometry data of the current point cloud slice, and the geometry data of the current point cloud slice is geometry data being encoded in the current point cloud slice. The start code of the geometry data of the current point cloud slice is configured for indicating a position at which encoding of the geometry data of the current point cloud slice starts, and the end code of the geometry data of the current point cloud slice is configured for indicating a position at which the encoding of the geometry data of the current point cloud slice ends.

In some embodiments, the start code of the geometry data of the current point cloud slice may be a preset bit string. In some embodiments, the start code of the geometry data of the current point cloud slice may be an end code of a previous point cloud slice of the current point cloud slice.

(4) The point cloud slice may include one or more groups of attribute data. If the data unit includes the attribute data of the point cloud slice, the parameter information of the current point cloud frame includes a start code and an end code of the attribute data of the current point cloud slice, and the attribute data of the current point cloud slice is attribute data being encoded in the current point cloud slice. The start code of the current attribute data of the current point cloud slice is configured for indicating a position at which encoding of the current attribute data of the current point cloud slice starts, and the end code of the current attribute data of the current point cloud slice is configured for indicating a position at which the encoding of the current attribute data of the current point cloud slice ends.

In some embodiments, the start code of the current attribute data of the current point cloud slice may be a preset bit string. In some embodiments, the start code of the current attribute data of the current point cloud slice may be an end code of previous attribute data of the current attribute data. In some embodiments, the start code of the current attribute data of the current point cloud slice may be an end code of the geometry data of the current point cloud slice.

In some embodiments, the start code of the current attribute data of the current point cloud slice is further configured for indicating a type of the current attribute data of the current point cloud slice.

(6) The parameter information of the point cloud frame is further configured for indicating whether the point cloud frame includes the parameter set.

The parameter set may include any one of the following: a geometry header parameter set, an attribute header parameter set, or a geometry header parameter set and an attribute header parameter set. The parameter information of the current point cloud frame may include any one of the following fields: a geometry header identifier field, an attribute header identifier field, or a number of attributes minus one field.

The geometry header identifier field is configured for indicating whether the current point cloud frame includes the geometry header parameter set. If the current point cloud frame includes the geometry header parameter set, a value of the geometry header identifier field is set to a first preset value (such as 1); and if the current point cloud frame does not include the geometry header parameter set, the value of the geometry header identifier field is set to a second preset value (such as 0).

In some embodiments, when the current point cloud frame is a first frame in the point cloud sequence, the value of the geometry header identifier field is set to the first preset value. In some embodiments, when the current point cloud frame is not the first frame in the point cloud sequence and the geometry header parameter set in the point cloud sequence is updated, the value of the geometry header identifier field is set to the first preset value. In some embodiments, when the current point cloud frame is not the first frame in the point cloud sequence and the geometry header parameter set in the point cloud sequence is not updated, the value of the geometry header identifier field is set to the second preset value.

The attribute header field is configured for indicating whether the current point cloud frame includes the attribute header parameter set. If the current point cloud frame includes the attribute header parameter set, a value of the attribute header identifier field is set to a first set value (such as 1); and if the current point cloud frame does not include the attribute header parameter set, the value of the attribute header identifier field is set to a second set value (such as 0).

In some embodiments, when the current point cloud frame is the first frame in the point cloud sequence, the value of the attribute header identifier field is set to the first set value. In some embodiments, when the current point cloud frame is not the first frame in the point cloud sequence and the attribute header parameter set in the point cloud sequence is updated, the value of the attribute header identifier field is set to the first set value. In some embodiments, when the current point cloud frame is not the first frame in the point cloud sequence and the attribute header parameter set in the point cloud sequence is not updated, the value of the attribute header identifier field is set to the second set value.

The number of attributes minus one field is configured for indicating a number of attribute data groups corresponding to the attribute header parameter set included in the current point cloud frame, and when the current point cloud frame is the first frame in the point cloud sequence, a value of the number of attributes minus one field is set to a maximum number of attribute data groups included in the point cloud sequence.

In the point cloud media, a group of attribute data corresponds to an attribute header parameter set; and a point cloud frame can include one or more attribute header parameter sets, and an attribute header parameter set can correspond to one or more groups of attribute data. For the attribute header parameter set, because different attribute data groups may correspond to different attribute header parameter sets, the parameters in the attribute header parameter set may be partially updated. Therefore, in this case, some embodiments at least use the following three methods (for example, a method A, a method B, and a method C) to establish a correspondence between the attribute header parameter set and the attribute data.

Method A: When a point cloud frame includes an attribute header parameter set, for example, the number of attribute header parameter sets in the point cloud frame is one. In this case, the attribute data groups in the point cloud media all refer to this attribute header parameter set when encoding is performed. In the point cloud media, a group of attribute data corresponds to an attribute header parameter set, and a point cloud frame includes one or more attribute header parameter sets. When a point cloud frame includes an attribute header parameter set, for example, the number of attribute header parameter sets in the point cloud frame is one, the attribute header parameter set includes an attribute present identifier field, and the attribute present identifier field is configured for indicating whether a current attribute header parameter set includes an encoding parameter of an $x^{th}$ group of attribute data, where x is an integer greater than or equal to 0 and less than or equal to 15; if the current attribute header parameter set includes the encoding parameter of the $x^{th}$ group of attribute data, a value of the attribute present identifier field is set to a first value; and if the current attribute header parameter set does not include the encoding parameter of the $x^{th}$ group of attribute data, the value of the attribute present identifier field is set to a second value.

Method B: When a point cloud frame includes an attribute header parameter set, for example, the number of attribute header parameter sets in the point cloud frame is one, the attribute header parameter set includes an attribute type field and an attribute data identifier field, and a correspondence between the attribute header parameter set and the attribute data is represented through the attribute type field and the attribute data identifier field; the number of attributes minus one field is configured for indicating a number of attribute data groups corresponding to the attribute header parameter set included in the current point cloud frame; and when the current point cloud frame is the first frame in the point cloud sequence, a value of the number of attributes minus one field is set to a maximum number of attribute data groups included in the point cloud sequence.

Method C: When a point cloud frame includes a plurality of attribute header parameter sets, the point cloud frame includes numAttributesMinus1 attribute header parameter sets, and a correspondence between the attribute encoding parameter and the attribute data can be established through the attribute type field and the attribute data identifier field. Any attribute header parameter set includes the attribute type field and the attribute data identifier field, and a correspondence between the attribute header parameter set and the attribute data is represented through the attribute type field and the attribute data identifier field.

503: Transmit the point cloud code stream.

In some embodiments, the point cloud media is obtained and encoded to obtain a point cloud code stream, the point cloud code stream includes one or more point cloud frames and parameter information of each point cloud frame, and the point cloud code stream is transmitted, which can flexibly organize the parameter information in the point cloud code stream, guide the decoding and presentation of the point cloud media, and optimize the resource overhead of the decoder side.

The data processing method of point cloud media provided in some embodiments is described in detail through an example below.

1. The content production device can obtain the point cloud media and encode the point cloud media to obtain a point cloud code stream. The point cloud code stream includes one or more point cloud frames. For each point cloud frame in the point cloud code stream:

1) Define frame-level parameter information, including a frame serial number, a frame timestamp, frame space information, and intra-frame data unit information; 2) Indicate, in the frame-level parameter information, whether the current frame includes the geometry header parameter set or attribute header parameter set; and 3) Add a corresponding start code and a corresponding end code to the data unit in the point cloud frame. For example, assume that the parameter information of each point cloud frame in the point cloud code stream is as follows.

Frame1: frameIdx=1; numSlice=2; timestampFlag=1; numTimestamp=1; timestampType=2; Timestamp=2022-09-05T16:24:05.023Z; spatialInfoFlag=0; geo_header_flag=1; attr_header_flag=1; numAttributesMinus1=1.

frameIdx=1 represents that the point cloud frame 1 has a serial number of 1 in the point cloud sequence (for example, the first frame in the point cloud sequence), numSlice=2 represents that the point cloud frame 1 includes two point cloud slices, timestampFlag=1 represents that the point cloud frame 1 includes a timestamp, numTimestamp=1 represents that a number of timestamps that the point cloud frame 1 includes is 1, timestampType=2 represents that the timestamp that the point cloud frame 1 includes is collection time, and the collection time is 2022-09-05T16:24:05. 023Z; spatialInfoFlag=0 represents that the space information of the point cloud frame 1 is not indicated; geo_header_flag=1 represents that the point cloud frame 1 includes the geometry header parameter set; and attr_header_flag=1 represents that the point cloud frame 1 includes the attribute header parameter set, and numAttributesMinus1=1 represents that the maximum number of attribute data groups that the point cloud sequence includes is 1.

Frame2 to Frame99: A value of frameIdx corresponds to 2 to 99, numSlice=2; timestampFlag=1; numTimestamp=1; timestampType=2; Timestamp corresponds to UTC time; spatialInfoFlag=0; geo_header_flag=0; attr_header_flag=0.

The point cloud frame 2 to the point cloud frame 99 (for example, Frame2 to Frame99) are sequentially numbered 2 to 99 in the point cloud sequence. For any point cloud frame of the point cloud frame 2 to the point cloud frame 99: numSlice=2 represents that the point cloud frame includes two point cloud slices, timestampFlag=1 represents that the point cloud frame includes a timestamp, numTimestamp=1 represents that the number of timestamps that the point cloud frame includes is 1, and spatialInfoFlag=0 represents that the space information of the point cloud frame 1 is not indicated; geo_header_flag=0 represents that the point cloud frame does not include the geometry header parameter set; and attr_header_flag=0 represents that the point cloud frame does not include the attribute header parameter set, and in this case, the geometry header parameter set or the attribute header parameter set in the point cloud frame 1 (Frame1) may be obtained when any point cloud frame of Frame2 to Frame99 is decoded.

Frame100: frameIdx=100; numSlice=2; timestampFlag=1; numTimestamp=1; timestampType=2; Timestamp corresponds to UTC time; spatialInfoFlag=0; geo_header_flag=1; attr_header_flag=1; numAttributesMinus1=0.

frameIdx=100 represents that the point cloud frame 100 has a serial number of 100 in the point cloud sequence, numSlice=2 represents that the point cloud frame 100 includes two point cloud slices, timestampFlag=1 represents that the point cloud frame 100 includes a timestamp, numTimestamp=1 represents that a number of timestamps that the point cloud frame 100 includes is 1, and timestampType=2 represents that the timestamp that the point cloud frame 100 includes is collection time; spatialInfoFlag=0 represents that the space information of the point cloud frame 100 is not indicated; geo_header_flag=1 represents that the point cloud frame 100 includes the geometry header parameter set; and attr_header_flag=1 represents that the point cloud frame 100 includes the attribute header parameter set, and numAttributesMinus1=0 represents the number of attribute data groups corresponding to the attribute header parameter set included in the point cloud frame 100, for example, the number of attribute data groups corresponding to the attribute header parameter set included in the point cloud frame 100 is 1. In this case, the attribute header parameter set and the geometry header parameter set in the point cloud sequence are updated.

Frame101 to Frame200: A value of frameIdx corresponds to 101 to 200, numSlice=2; timestampFlag=1; numTimestamp 32 1; timestampType=2; Timestamp corresponds to UTC time; spatialInfoFlag=0; geo_header_flag=0; attr_header_flag=0.

The point cloud frame 101 to the point cloud frame 200 (for example, Frame101 to Frame200) are sequentially numbered 101 to 200 in the point cloud sequence. For any point cloud frame of the point cloud frame 101 to the point cloud frame 200: numSlice=2 represents that the point cloud frame includes two point cloud slices, timestampFlag=1 represents that the point cloud frame includes a timestamp, numTimestamp=1 represents that the number of timestamps that the point cloud frame includes is 1, and spatialInfoFlag=0 represents that the space information of the point cloud frame 1 is not indicated; geo_header_flag=0 represents that the point cloud frame does not include the geometry header parameter set; and attr_header_flag=0 represents that the point cloud frame does not include the attribute header parameter set, and in this case, the geometry header parameter set or the attribute header parameter set in the point cloud frame 100 (Frame100) may be obtained when any point cloud frame of Frame101 to Frame200 is decoded (for example, the updated geometry header parameter set and the updated attribute header parameter set are used).

2. The content production device may transmit the point cloud code stream to the media processing device.

3. The media processing device, when decoding the point cloud code stream: (1) can correctly decode the geometry data and the attribute data of the point cloud frame 1 to the point cloud frame 99 according to the geometry header parameter set and the attribute header parameter set indicated in frame1. The geometry header parameter set and the attribute header parameter set included in frame1 are valid until frame100 updates the geometry header parameter set and an attribute header parameter set of a group of attribute data, and the point cloud frame 100 to the point cloud frame 200 can be correctly decoded according to the updated geometry header parameter set and the updated attribute header parameter set of the group of attribute data in frame100.

(2) can obtain, from the point cloud code stream, timestamp information indicated by the parameter information of each point cloud frame, and obtain the collection time of each point cloud frame according to the timestamp information carried in each point cloud frame frame, and display each point cloud frame at appropriate time according to the collection time of each point cloud frame, so that the point cloud map can be updated in real time, for example, in an autonomous driving scenario, through the collection time of each point cloud frame.

(3) The parameter information of each point cloud frame can indicate the start code and the end code of the intra-frame data unit, and the media processing device can quickly position the data unit according to the start code and the end code of the intra-frame data unit indicated by the parameter information of each point cloud frame, thereby achieving the objective of partial decoding. For example, in each point cloud frame, there are two point cloud slices, and the parameter information of the point cloud frame may indicate the start code and the end code of each point cloud slice. When a space region corresponding to a point cloud slice may be consumed, the corresponding point cloud slice may be selected for partial decoding according to the start code and the end code of the point cloud slice indicated by the parameter information of each point cloud frame, for example, the corresponding point cloud slice is selected for partial decoding according to the start codes 00 to 7F of the point cloud slice. For another example, when the data unit includes the attribute data of the point cloud slice, the start code of the attribute data of the point cloud slice is 88, and the start code 88 of the attribute data of the point cloud slice is configured for indicating that a type of the attribute data of the point cloud slice is color. When color-attribute data may be presented, the color-attribute data may be selected for partial decoding according to the start code 88 of the attribute data of the point cloud slice.

In some embodiments, the content production device can obtain the point cloud media and encode the point cloud media to obtain a point cloud code stream; the point cloud code stream is encapsulated to obtain a media file of the point cloud media; and the media processing device can obtain the media file and decode the media file to obtain the point cloud code stream, which can flexibly organize the parameter information of each point cloud frame in the point cloud code stream, guide the transmission, decoding, and presentation of the point cloud media, realize partial decoding on the decoder side, thereby optimizing the resource overhead on the decoder side.

Referring to FIG. 6, FIG. 6 is a schematic diagram of a structure of a data processing apparatus of point cloud media according to some embodiments. The data processing apparatus of point cloud media may be arranged in a computer device provided in some embodiments, and the computer device may be the media processing device mentioned in the method according to some embodiments. The data processing apparatus of point cloud media shown in FIG. 6 may be a computer program (including program code) running in the computer device, and the data processing apparatus of point cloud media may be configured to perform some or all of the operations in the method according to some embodiments as illustrated in FIG. 3. Referring to FIG. 6, the data processing apparatus of point cloud media may include the following units:

an obtaining unit 601, configured to obtain a point cloud code stream of the point cloud media, the point cloud code stream including one or more point cloud frames and parameter information of each point cloud frame, and the parameter information of the point cloud frame being configured for indicating at least one of the following information: a frame serial number, frame timestamp information, frame space information, or intra-frame data unit information; and a processing unit 602, configured to decode the point cloud code stream based on the parameter information of each point cloud frame to present the point cloud media.

Regarding the data format of the point cloud code stream, reference may be made to the above, which is not repeated herein.

Figure 7:
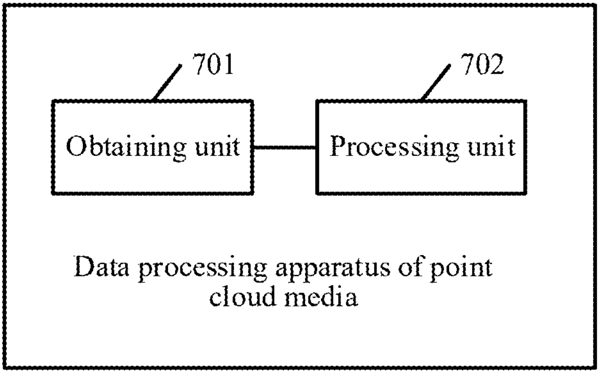
FIG. 7 is a schematic diagram of a structure of a data processing apparatus of point cloud media according to some embodiments.

Referring to FIG. 7, FIG. 7 is a schematic diagram of a structure of a data processing apparatus of point cloud media according to some embodiments. The data processing apparatus of point cloud media may be arranged in a computer device provided in some embodiments, and the computer device may be the content production device mentioned in the method according to some embodiments. The data processing apparatus of point cloud media shown in FIG. 7 may be a computer program (including program code) running in the computer device, and the data processing apparatus of point cloud media may be configured to perform some or all of the operations in the method according to some embodiments as illustrated in FIG. 5. Referring to FIG. 7, the data processing apparatus of point cloud media may include the following units:

an obtaining unit 701, configured to obtain the point cloud media; and a processing unit 702, configured to encode the point cloud media to obtain a point cloud code stream, the point cloud code stream including one or more point cloud frames and parameter information of each point cloud frame, and the parameter information of the point cloud frame being configured for indicating at least one of the following information: a frame serial number, frame timestamp information, frame space information, or intra-frame data unit information; and the processing unit 702 being further configured to transmit the point cloud code stream.

According to some embodiments, each unit may exist respectively or be combined into one or more units. Some units may be further split into multiple smaller function subunits, thereby implementing the same operations without affecting the technical effects of some embodiments. The units are divided based on logical functions. In actual applications, a function of one unit may be realized by multiple units, or functions of multiple units may be realized by one unit. In some embodiments, the apparatus may further include other units. In actual applications, these functions may also be realized cooperatively by the other units, and may be realized cooperatively by multiple units.

A person skilled in the art would understand that these "units" could be implemented by hardware logic, a processor or processors executing computer software code, or a combination of both. The "units" may also be implemented in software stored in a memory of a computer or a non-transitory computer-readable medium, where the instructions of each unit are executable by a processor to thereby cause the processor to perform the respective operations of the corresponding unit.

Regarding the data format of the point cloud code stream, reference may be made to the above, which is not repeated herein.

Figure 8:
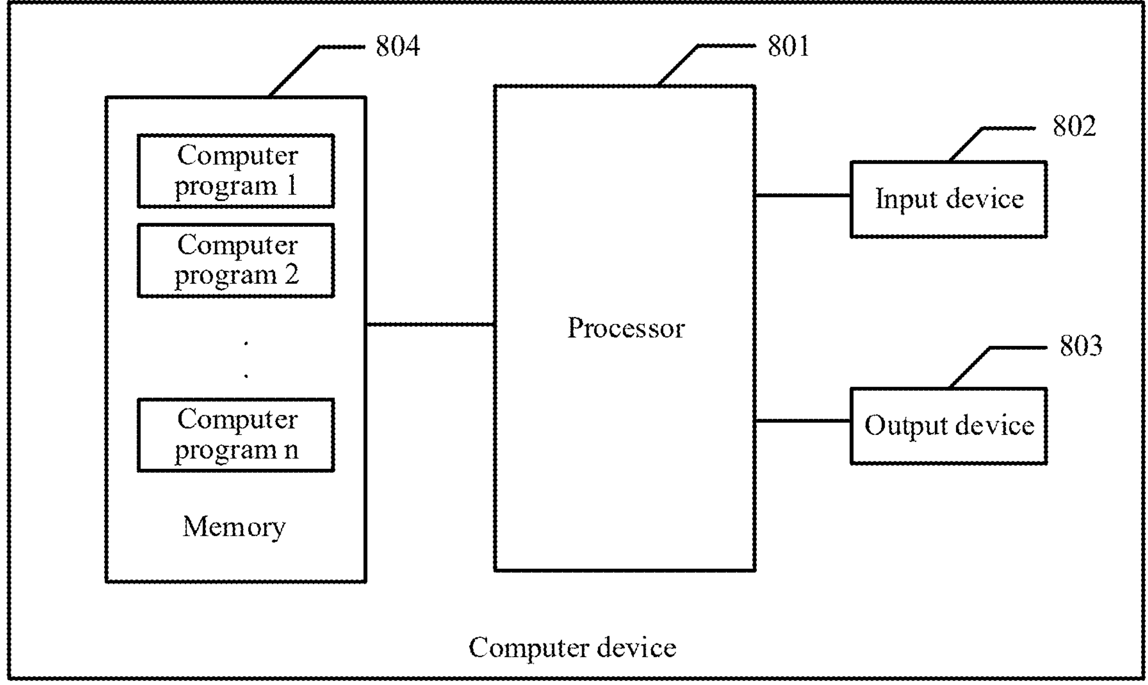
FIG. 8 is a schematic diagram of a structure of a computer device according to some embodiments.

Some embodiments further provide a schematic diagram of a structure of a computer device. For the schematic diagram of the structure of the computer device, refer to FIG. 8. The computer device may be the media processing device or the content production device described above. The computer device may include: a processor 801, an input device 802, an output device 803, and a memory 804. The processor 801, the input device 802, the output device 803, and the memory 804 are connected through a bus. The memory 804 is configured to store a computer program. The computer program includes program instructions. The processor 801 is configured to execute the program instructions stored in the memory 804.

When the computer device is the foregoing media processing device, in some embodiments, the processor 801 performs the foregoing data processing method of point cloud media by running executable program code in the memory 804.

When the computer device is the foregoing content production device, in some embodiments, the processor 801 performs the foregoing data processing method of point cloud media by running the executable program code in the memory 804.

Some embodiments further provide a computer-readable storage medium. The computer-readable storage medium has a computer program stored therein, and the computer program includes program instructions. When the processor executes the foregoing program instructions, the processor can perform the method according to some embodiments as illustrated in FIG. 3 and FIG. 5. Reference may also be made to descriptions of the method according to some embodiments. In an example, the program instructions may be deployed to be executed on a computer device, or deployed to be executed on a plurality of computer devices at the same location, or deployed to be executed on a plurality of computer devices that are distributed in a plurality of locations and interconnected by using a communication network.

According to some embodiments, a computer program product is provided, including a computer program, the computer program being stored in a computer-readable storage medium. A processor of a computer device reads the computer program from the computer-readable storage medium, and executes the computer program, so that the computer device can perform the method according to some embodiments as illustrated in FIG. 3 and FIG. 5.

A person skilled in the art may understand that all or some of the procedures of the methods of the foregoing embodiments may be implemented by a computer program instructing relevant hardware. The program may be stored in a computer-readable storage medium. When the program is executed, the procedures of the method according to some embodiments may be implemented. The storage medium may be a magnetic disk, an optical disc, a read-only memory (ROM), a RAM, or the like.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A data processing method of point cloud media, performed by a computer device, the method comprising:

obtaining a point cloud code stream of the point cloud media comprising one or more point cloud frames and parameter information of the one or more point cloud frames; and decoding the point cloud code stream by at least determining a type of one or more timestamps corresponding to the one or more point cloud frames based on the parameter information to present the point cloud media, wherein the parameter information indicates at least one of: a frame serial number, frame timestamp information, frame space information, or intra-frame data unit information.

2. The method according to claim 1, wherein the parameter information indicates the frame serial number, and the one or more point cloud frames form a point cloud sequence, wherein first parameter information of a current point cloud frame in the point cloud sequence comprises a frame serial number field indicating a serial number of the current point cloud frame, and wherein the current point cloud frame is being decoded in the point cloud code stream.

3. The method according to claim 1, wherein the parameter information indicates the frame timestamp information, and first parameter information of a current point cloud frame comprises at least one of: a timestamp identifier field, a number of timestamps field, a timestamp type field, or a timestamp field, wherein the timestamp identifier field indicates whether the current point cloud frame comprises a timestamp, wherein, based on a first value of the timestamp identifier field being a first preset value, the current point cloud frame does not include the timestamp; and based on the first value being a second preset value, the current point cloud frame includes the timestamp, wherein the number of timestamps field indicates a number of timestamps comprised in the current point cloud frame, wherein the timestamp type field indicates a type of a current timestamp of the one or more timestamps, wherein, based on a second value of the timestamp type field being a third preset value, the type of the current timestamp is decoding time, based on the second value being a fourth preset value, the type of the current timestamp is presentation time, and based on the second value being a fifth preset value, the type of the current timestamp is collection time, wherein the timestamp field indicates at least one of: a first collection time of the current point cloud frame, a first presentation time of the current point cloud frame, or a first decoding time of the current point cloud frame, the timestamp field indicates coordinated universal time, or universal time according to a preset format, comprising at least one of: a year timestamp field, an hour timestamp field, a second timestamp field, or a frame timestamp field, and wherein the current point cloud frame is being decoded in the point cloud code stream, and the current timestamp is being used by the current point cloud frame.

4. The method according to claim 1, wherein the parameter information indicates the frame space information, and first parameter information of a current point cloud frame comprises a space information identifier field, wherein the space information identifier field represents whether to indicate space information of the current point cloud frame, wherein, based on a third value of the space information identifier field being a sixth preset value, the space information is indicated; and based on the third value being a seventh preset value, the space information is not indicated, and wherein the space information comprises at least one of: coordinate information of an origin of a bounding box of the current point cloud frame, width information of the bounding box, or depth information of the bounding box.

5. The method according to claim 1, wherein the parameter information indicates the intra-frame data unit information, wherein one point cloud frame comprises one or more data units, wherein a data unit comprises a point cloud slice, and wherein first parameter information of a current point cloud frame comprises at least one of:

a number of point cloud slices field indicating a number of point cloud slices in the current point cloud frame, or a number of point cloud slices minus one field indirectly indicating the number of point cloud slices in the current point cloud frame, and wherein the current point cloud frame is a point cloud frame being decoded in the point cloud code stream.

6. The method according to claim 1, wherein the parameter information further indicates whether one point cloud frame comprises a parameter set comprising at least one of: a geometry header parameter set, or an attribute header parameter set, wherein first parameter information of a current point cloud frame comprises: a geometry header identifier field, an attribute header identifier field, or a number of attributes minus one field, wherein the geometry header identifier field is indicates whether the current point cloud frame comprises the geometry header parameter set, wherein, based on a fourth value of the geometry header identifier field being an eighth preset value, the current point cloud frame comprises the geometry header parameter set, and based on the fourth value being a ninth preset value, the current point cloud frame does not comprise the geometry header parameter set, wherein the attribute header identifier field is indicates whether the current point cloud frame comprises the attribute header parameter set, wherein, based on a fifth value of the attribute header identifier field being a tenth preset value, the current point cloud frame comprises the attribute header parameter set, and based on the fifth value being an eleventh preset value, the current point cloud frame does not comprise the attribute header parameter set, and wherein the number of attributes minus one field indicates a number of attribute data groups corresponding to the attribute header parameter set in the current point cloud frame.

7. The method according to claim 6, wherein the one or more point cloud frames form a point cloud sequence, wherein, based on the current point cloud frame being a first frame in the point cloud sequence, the fourth value is set to the eighth preset value, the fifth value is set to the tenth preset value, and a sixth value of the number of attributes minus one field is a maximum number of attribute data groups in the point cloud sequence, wherein, based on the current point cloud frame not being the first frame in the point cloud sequence, based on the fourth value being set to the eighth preset value, the geometry header parameter set in the point cloud sequence is updated, and wherein, based on the current point cloud frame not being the first frame in the point cloud sequence, based on the sixth value being set to the tenth preset value, the attribute header parameter set in the point cloud sequence is updated.

8. The method according to claim 6, wherein in the point cloud media, a group of attribute data corresponds to a first attribute header parameter set, wherein the first attribute header parameter set comprises an attribute present identifier field indicating whether a current attribute header parameter set comprises an encoding parameter of an $x^{th}$ group of attribute data, wherein x is an integer greater than or equal to 0 and less than or equal to 15, wherein, based on a value of the attribute present identifier field being a seventh value, the current attribute header parameter set comprises the encoding parameter of the $x^{th}$ group of attribute data, and wherein, based on the value of the attribute present identifier field being an eighth value, the current attribute header parameter set does not comprise the encoding parameter of the $x^{th}$ group of attribute data.

9. The method according to claim 6, wherein the attribute header parameter set comprises an attribute type field and an attribute data identifier field, and a correspondence between the attribute header parameter set and attribute data is represented through the attribute type field and the attribute data identifier field.

10. The method according to claim 5, wherein the parameter information indicates the intra-frame data unit information, wherein, based on the data unit comprising the point cloud frame, the first parameter information comprises a first start code of the current point cloud frame and a first end code of the current point cloud frame, and the current point cloud frame is being decoded in the point cloud code stream, wherein based on the data unit comprising the point cloud slice, the first parameter information comprises a second start code of a current point cloud slice in the current point cloud frame and a second end code of the current point cloud slice, and the current point cloud slice is being decoded in the point cloud code stream, wherein, based on the data unit comprising geometry data of the point cloud slice, the first parameter information comprises a third start code of the geometry data and a third end code of the geometry data, and wherein, based on the data unit comprising attribute data of the point cloud slice, the first parameter information comprises a fourth start code of current attribute data of the current point cloud slice and a fourth end code of the current attribute data, and the current attribute data is being decoded in the current point cloud slice.

11. A data processing apparatus of point cloud media, comprising:

at least one memory configured to store computer program code; and at least one processor configured to read the program code and operate as instructed by the program code, the program code comprising:

obtaining code configured to cause at least one of the at least one processor to obtain a point cloud code stream of the point cloud media comprising one or more point cloud frames and parameter information of the one or more point cloud frames, and processing code configured to cause at least one of the at least one processor to decode the point cloud code stream based on a determination of a type of one or more timestamps corresponding to the one or more point cloud frames using the parameter information, wherein the parameter information indicates at least one of: a frame serial number, frame timestamp information, frame space information, or intra-frame data unit information.

12. The apparatus according to claim 11, wherein the parameter information indicates the frame serial number, and the one or more point cloud frames form a point cloud sequence, wherein first parameter information of a current point cloud frame in the point cloud sequence comprises a frame serial number field indicating a serial number of the current point cloud frame, and wherein the current point cloud frame is being decoded in the point cloud code stream.

13. The apparatus according to claim 11, wherein the parameter information indicates the frame timestamp information, and first parameter information of a current point cloud frame comprises at least one of: a timestamp identifier field, a number of timestamps field, a timestamp type field, or a timestamp field, wherein the timestamp identifier field indicates whether the current point cloud frame comprises a timestamp, wherein, based on a first value of the timestamp identifier field being a first preset value, the current point cloud frame does not include the timestamp; and based on the first value being a second preset value, the current point cloud frame includes the timestamp, wherein the number of timestamps field indicates a number of timestamps comprised in the current point cloud frame, wherein the timestamp type field indicates a type of a current timestamp of the one or more timestamps, wherein, based on a second value of the timestamp type field being a third preset value, the type of the current timestamp is decoding time, based on the second value being a fourth preset value, the type of the current timestamp is presentation time, and based on the second value being a fifth preset value, the type of the current timestamp is collection time, wherein the timestamp field indicates at least one of: a first collection time of the current point cloud frame, a first presentation time of the current point cloud frame, or a first decoding time of the current point cloud frame, the timestamp field indicates coordinated universal time, or universal time according to a preset format, comprising at least one of: a year timestamp field, an hour timestamp field, a second timestamp field, or a frame timestamp field, and wherein the current point cloud frame is being decoded in the point cloud code stream, and the current timestamp is being used by the current point cloud frame.

14. The apparatus according to claim 11, wherein the parameter information indicates the frame space information, and first parameter information of a current point cloud frame comprises a space information identifier field, wherein the space information identifier field represents whether to indicate space information of the current point cloud frame, wherein, based on a third value of the space information identifier field being a sixth preset value, the space information is indicated; and based on the third value being a seventh preset value, the space information is not indicated, and wherein the space information comprises at least one of: coordinate information of an origin of a bounding box of the current point cloud frame, width information of the bounding box, or depth information of the bounding box.

15. The apparatus according to claim 11, wherein the parameter information indicates the intra-frame data unit information, wherein one point cloud frame comprises one or more data units, wherein a data unit comprises a point cloud slice, and wherein first parameter information of a current point cloud frame comprises at least one of:

a number of point cloud slices field indicating a number of point cloud slices in the current point cloud frame, or a number of point cloud slices minus one field indirectly indicating the number of point cloud slices in the current point cloud frame, and wherein the current point cloud frame is a point cloud frame being decoded in the point cloud code stream.

16. The apparatus according to claim 11, wherein the parameter information further indicates whether one point cloud frame comprises a parameter set comprising at least one of: a geometry header parameter set, or an attribute header parameter set, wherein first parameter information of a current point cloud frame comprises: a geometry header identifier field, an attribute header identifier field, or a number of attributes minus one field, wherein the geometry header identifier field is indicates whether the current point cloud frame comprises the geometry header parameter set, wherein, based on a fourth value of the geometry header identifier field being an eighth preset value, the current point cloud frame comprises the geometry header parameter set, and based on the fourth value being a ninth preset value, the current point cloud frame does not comprise the geometry header parameter set, wherein the attribute header identifier field is indicates whether the current point cloud frame comprises the attribute header parameter set, wherein, based on a fifth value of the attribute header identifier field being a tenth preset value, the current point cloud frame comprises the attribute header parameter set, and based on the fifth value being an eleventh preset value, the current point cloud frame does not comprise the attribute header parameter set, and wherein the number of attributes minus one field indicates a number of attribute data groups corresponding to the attribute header parameter set in the current point cloud frame.

17. The apparatus according to claim 16, wherein the one or more point cloud frames form a point cloud sequence, wherein, based on the current point cloud frame being a first frame in the point cloud sequence, the fourth value is set to the eighth preset value, the fifth value is set to the tenth preset value, and a sixth value of the number of attributes minus one field is a maximum number of attribute data groups in the point cloud sequence, wherein, based on the current point cloud frame not being the first frame in the point cloud sequence, based on the fourth value being set to the eighth preset value, the geometry header parameter set in the point cloud sequence is updated, and wherein, based on the current point cloud frame not being the first frame in the point cloud sequence, based on the sixth value being set to the tenth preset value, the attribute header parameter set in the point cloud sequence is updated.

18. The apparatus according to claim 16, wherein in the point cloud media, a group of attribute data corresponds to a first attribute header parameter set, wherein the first attribute header parameter set comprises an attribute present identifier field indicating whether a current attribute header parameter set comprises an encoding parameter of an $x^{th}$ group of attribute data, wherein x is an integer greater than or equal to 0 and less than or equal to 15, wherein, based on a value of the attribute present identifier field being a seventh value, the current attribute header parameter set comprises the encoding parameter of the $x^{th}$ group of attribute data, and wherein, based on the value of the attribute present identifier field being an eighth value, the current attribute header parameter set does not comprise the encoding parameter of the $x^{th}$ group of attribute data.

19. The apparatus according to claim 16, wherein the attribute header parameter set comprises an attribute type field and an attribute data identifier field, and a correspondence between the attribute header parameter set and attribute data is represented through the attribute type field and the attribute data identifier field.

20. A non-transitory computer-readable storage medium, storing computer code which, when executed by at least one processor, causes the at least one processor to at least:

obtain a point cloud code stream of point cloud media comprising one or more point cloud frames and parameter information of the one or more point cloud frames, and decode the point cloud code stream by at least determining a type of one or more timestamps corresponding to the one or more point cloud frames based on the parameter information, wherein the parameter information indicates at least one of: a frame serial number, frame timestamp information, frame space information, or intra-frame data unit information.

* * * * *